United States Patent
Namizuka et al.

(10) Patent No.: US 7,161,714 B1
(45) Date of Patent: Jan. 9, 2007

(54) APPARATUS AND METHOD FOR PROCESSING IMAGES, AND COMPUTER PRODUCT

(75) Inventors: Yoshiyuki Namizuka, Tokyo (JP); Hideto Miyazaki, Tokyo (JP); Shinya Miyazaki, Tokyo (JP); Sugitaka Oteki, Tokyo (JP); Hiroyuki Kawamoto, Tokyo (JP); Yuji Takahashi, Tokyo (JP); Rie Ishii, Tokyo (JP); Hiroaki Fukuda, Tokyo (JP); Fumio Yoshizawa, Tokyo (JP); Takeharu Tone, Tokyo (JP); Yasuyuki Nomizu, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 733 days.

(21) Appl. No.: 09/713,194

(22) Filed: Nov. 16, 2000

(30) Foreign Application Priority Data

Nov. 25, 1999 (JP) ................................. 11-334694

(51) Int. Cl.
  *H04N 1/393* (2006.01)
(52) U.S. Cl. ..................... 358/3.07; 358/1.2
(58) Field of Classification Search ................ 358/1.9, 358/1.15, 3.06–3.12, 1.2, 528, 451; 382/298–300
See application file for complete search history.

(56) References Cited

U.S. PATENT DOCUMENTS

| | | | |
|---|---|---|---|
| 5,050,221 A | | 9/1991 | Ohta et al. |
| 5,096,180 A | * | 3/1992 | Nagaoka et al. ............ 271/110 |
| 5,369,733 A | * | 11/1994 | Arimoto et al. ............ 358/1.2 |
| 5,715,070 A | | 2/1998 | Tone et al. |
| 5,839,033 A | | 11/1998 | Takahashi et al. ......... 399/187 |
| 5,946,527 A | * | 8/1999 | Salgado et al. ............. 399/82 |
| 6,041,139 A | | 3/2000 | Okubo et al. |
| 6,075,623 A | * | 6/2000 | Yun ........................... 358/486 |
| 6,081,687 A | | 6/2000 | Munemori et al. |
| 6,377,359 B1 | * | 4/2002 | Higashio .................... 358/1.2 |

FOREIGN PATENT DOCUMENTS

| | | |
|---|---|---|
| CN | 1161479 | 10/1997 |
| JP | 7-99575 | 4/1995 |
| JP | 08-274986 | 10/1996 |
| JP | 8-274986 | 10/1996 |
| JP | 9-331418 | 12/1997 |
| JP | 2789560 | 6/1998 |
| JP | 11-17932 | 1/1999 |

OTHER PUBLICATIONS

U.S. Appl. No. 09/713,194, filed Nov. 16, 2000, Namizuka et al.
U.S. Appl. No. 10/393,945, filed Mar. 24, 2003, Namizuka.
U.S. Appl. No. 10/632,957, filed Aug. 4, 2003, Namizuka.
U.S. Appl. No. 10/641,049, filed Aug. 15, 2003, Nomizu.
U.S. Appl. No. 10/797,129, filed Mar. 11, 2004, Nomizu.
U.S. Appl. No. 10/805,184, filed Mar. 22, 2004, Namizuka.
U.S. Appl. No. 09/024,290, filed Feb. 17, 1998, Allowed.

(Continued)

*Primary Examiner*—Thomas D. Lee
*Assistant Examiner*—Stephen Brinich
(74) *Attorney, Agent, or Firm*—Oblon, Spivak, McClelland, Maier & Neustadt, P.C.

(57) ABSTRACT

Documents are read and the read image data and the information about the size of the document is stored in a memory. A factor of enlargement/reduction is calculated based on the stored size information. An image processor 204 interpolates the image data based on the calculated enlargement/reduction factor and reproduces the enlarged/reduced document.

14 Claims, 18 Drawing Sheets

OTHER PUBLICATIONS

U.S. Appl. No. 09/122,108, filed Jul. 24, 1998, Pending.
U.S. Appl. No. 09/161,225, filed Sep. 28, 1998, Pending.
U.S. Appl. No. 09/204,162, filed Dec. 3, 1998, Allowed.
U.S. Appl. No. 09/266,800, filed Mar. 12, 1999, Pending.
U.S. Appl. No. 09/262,317, filed Mar. 4, 1999, Pending.
U.S. Appl. No. 09/348,631, filed Jul. 6, 1999, Pending.
U.S. Appl. No. 09/437,088, filed Nov. 9, 1999, Pending.
U.S. Appl. No. 09/443,889, filed Nov. 19, 1999, Pending.
U.S. Appl. No. 09/468,954, filed Dec. 22, 1999, Pending.
U.S. Appl. No. 09/484,254, filed Jan. 18, 2000, Pending.
U.S. Appl. No. 10/360,749, filed Feb. 10, 2003, Namizuka.

* cited by examiner

APPARATUS AND METHOD FOR PROCESSING IMAGES, AND COMPUTER PRODUCT

FIELD OF THE INVENTION

The present invention relates to a technology for electrically carrying out the enlargement/reduction of image data.

BACKGROUND OF THE INVENTION

Examples of a device for optically reading a document include a copying machine and a scanner. Examples of a method of reading the document using these apparatuses include a pressure plate method using a document reading unit and a method using a sheet through document feeder (ADF).

FIG. 18 is a diagram typically showing a reading mechanism for a general document reading unit. In the pressure plate method, a document 11 to be read is put on a contact glass 12. A carriage 15 including an illumination lamp 13 and a mirror group 14 is moved with respect to the document 11. Consequently, a document surface is read. The carriage 15 is driven by means of a stepping motor which is not shown.

On the other hand, in the pressure plate method, the moving speed of the carriage 15 for the document 11 is controlled when reading the document. Consequently, the number of optical reading lines per unit distance is controlled in the moving direction of the carriage 15 (which will be hereinafter referred to as a feeding direction).

More specifically, when the original document 11 is to be enlarged, the carriage 15 is controlled to be moved more slowly than when the ratio of the size of the original document 11 to that of the output document is 1:1. When the carriage 15 is moved slowly, the number of the reading lines per unit distance in the feeding direction is increased.

On the contrary, when the document 11 is to be reduced (contracted), the carriage 15 is controlled to be moved quickly. When the carriage 15 is moved quickly, the number of the reading lines in the feeding direction is decreased. Thus, the enlargement/reduction processing in the feeding direction is carried out. On the other hand, one line data are electrically subjected to the enlargement/reduction processing to carry out the enlargement or reduction in a direction crossing the feeding direction (which will be hereinafter referred to as a scanning direction).

In general, a copying machine is provided with a document size sensor which detects the document size electrically. The size of the document is detected with this document size sensor before the movement of the carriage 15 is started, that is, before starting the rearing of the document 11. Accordingly, if enlargement/reduction is selected, before starting the rearing of the document, the amount of enlargement/reduction is calculated based on the document size and the paper size.

For example, even if documents having variable sizes such as A3, B4, A4 or B5 are put on the contact glass 12 in a longitudinal or transverse direction, a parameter for enlargement/reduction control is calculated by a process controller before the movement of the carriage 15 is started. The moving speed of the carriage 15 is controlled based on the parameter.

FIG. 19 is a diagram typically showing a reading mechanism using an ordinary sheet through document feeder. The document 11 to be read is delivered to automatically pass through a reading position by means of a sheet through document feeder 16 having a document feeding mechanism.

The carriage 15 is maintained to be fixed into the reading position. In other words, in the pressure plate method, the carriage 15 is moved with respect to the stationary document 11. However, when the sheet through document feeder 16 is used, the document 11 is moved with respect to the stationary carriage 15.

The moving speed of the document 11 is controlled by the driving operation of the stepping motor (which is not shown). The moving speed of the document 11 is controlled when the document 11 is to be enlarged or reduced in the document feeding direction. In the same manner as in the pressure plate method, the enlargement or reduction can be implemented by changing a relative speed for the movement between the document 11 and the carriage 15.

When the sheet through document feeder 16 is used, the size of the document is detected by means of a mechanical sensor. The size of the document in the feeding direction is detected when the operation for reading the document 11 is completed. In other words, the size of the document 11 in the feeding direction is unknown when starting reading of the document 11. Accordingly, it is impossible to calculate a parameter for enlargement/reduction control. For this reason, the feeding speed of the document 11 cannot be controlled depending upon the enlargement/reduction factor.

Along the scanning direction, the document size is detected when the document 11 reaches the position of a sensor. Accordingly, when the documents 11 of various sizes exist, it is impossible to calculate the parameter for the enlargement/reduction control before the document reading processing is started.

The image of the document 11 which is read by using the sheet through document feeder 16 has a mirror image relationship with an image obtained in a pressure plate mode in the scanning direction. Accordingly, a mirroring processing of replacing the right with the left is carried out during image output.

These days a digital copying machine has come into market in addition to the analog copying machine. The digital copying machine has such a structure that a paper document or the like is optically read and a read image signal is converted into a digital image signal to carry out an image processing. In the digital copying machine, moreover, there has been a digital composite machine having a scanner function, a printer function and a facsimile function in addition to a copying function.

Some digital copying machines and some digital composite machines (which will be hereinafter referred to as a digital composite machine and the like) carry out enlargement/reduction through electrical control in place of the enlargement/reduction through mechanical control described above.

For example, Japanese Patent No. 2789560 discloses a "enlargement/reduction processing apparatus for image data" as an example of such a machine. Further, Japanese Laid-Open Patent Publication No. HEI 8-274986 discloses "image processing apparatus" as an example of a digital composite machine.

In a conventional document reading mechanism using the sheet through document feeder, however, there has not been proposed an apparatus capable of automatically copying documents having various sizes with an enlargement or a reduction. The reason is that the conventional document reading mechanism cannot discriminate the size of the document before the document is started to be read. Thus, size after enlargement/reduction cannot be determined.

SUMMARY OF THE INVENTION

It is an object of the present invention to provide a method and apparatus capable of reading documents having various sizes and carrying out an image processing in a document reading mechanism using a sheet through document feeder. It is also an object of the present invention to provide a computer readable recording medium recording a program for causing a computer to execute the method according to the present invention.

In the method and apparatus for processing images according to the present invention, image data is generated by reading the document and the generated image data and information about the size of the document from which the image data is read are stored in a correlated manner. When, the amount of enlargement/reduction is specified, enlargement/reduction factor is calculated based on the stored information. Thus, the enlargement/reduction factor can be calculated because the read image data and the document size are available. Accordingly, enlargement/reduction can be performed even if documents having various sizes are mixed in a sheet through document feeder.

A computer program which when executed on a computer realizes the method according to the present invention is stored in a recording medium such as a floppy disk or CD-ROM according to the present invention. Accordingly, the method according to the present invention can be executed readily and automatically.

Other objects and features of this invention will become apparent from the following description with reference to the accompanying drawings.

DESCRIPTION OF THE PREFERRED EMBODIMENTS

Preferred embodiments of the method and apparatus for processing images, and a computer readable recording medium according to the present invention will be described here with reference to the accompanying drawings.

Figure 1:
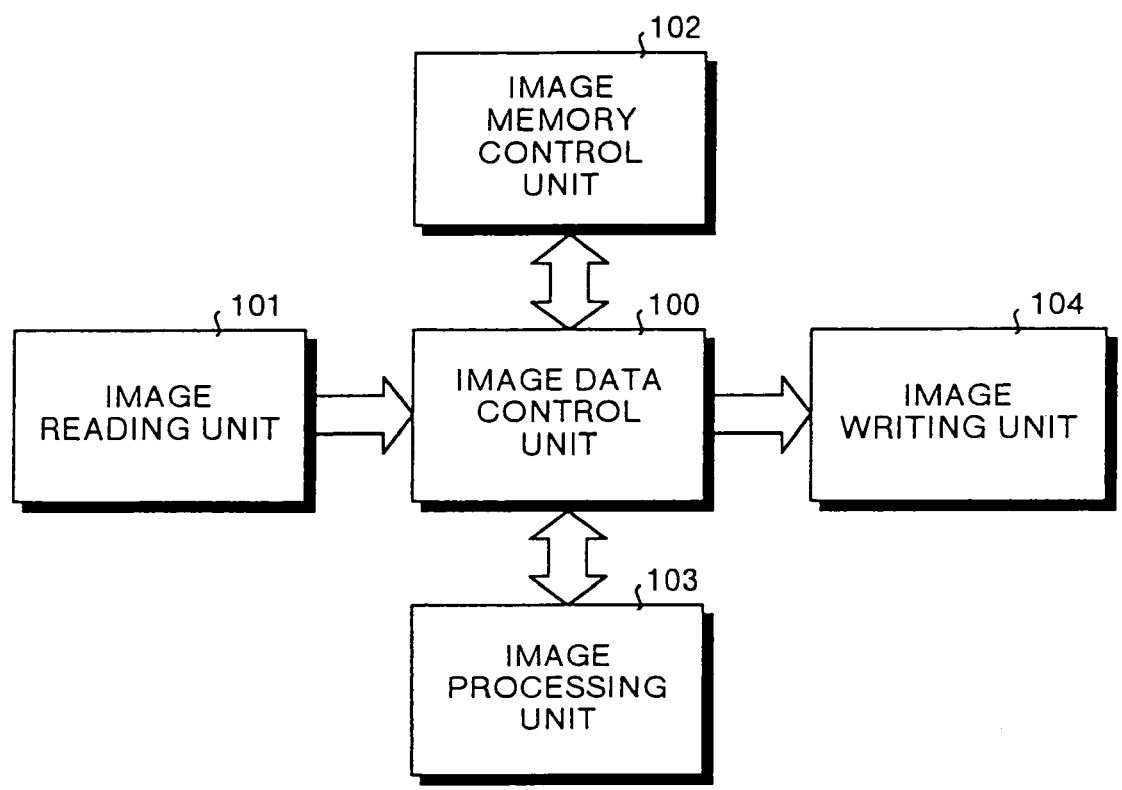
FIG. 1 is a block diagram functionally showing a structure of an image processing apparatus according to a first embodiment of the present invention.

To begin with, principle of the image processing apparatus according to a first embodiment will be described. FIG. 1 is a block diagram functionally showing the structure of the image processing apparatus according to the first embodiment of the present invention.

The image processing apparatus comprises an image data control unit 100, an image reading unit 101, an image memory control unit 102, an image processing unit 103 and an image writing unit 104. The image reading unit 101, the image memory control unit 102, the image processing unit 103 and the image writing unit 104 are connected to the image data control unit 100.

The image reading unit 101 serves to read a document and obtain image data. The image memory control unit 102 serves to write or read the image data to or from an image memory for storing the image data. The image processing unit 103 serves to carry out, for the image data, an image processing such as manipulation or edit. The image writing unit 104 serves to write the image data to a transfer paper or the like.

Examples of a processing to be carried out by the image data control unit 100 include the following processings (1) to (11):

(1) a data compression processing for enhancing the bus transfer efficiency of data (primary compression);
(2) a processing of transferring primary compressed data to image data;
(3) an image synthesis processing (which can synthesize image data sent from a plurality of units and also includes a synthesis on a data bus);
(4) an image shift processing (which shifts an image in a scanning direction and a feeding direction);
(5) an image area expansion processing (which can expand an image area to the periphery in an optional quantity);

(6) an image enlargement/reduction processing (for example, a fixed enlargement/reduction of 50% or 200%)
(7) a parallel bus interface processing;
(8) a serial bus interface processing (an interface with a process controller 211 which will be described below);
(9) a format converting processing for parallel data and serial data;
(10) an interface processing with the image reading unit 101; and
(11) an interface processing with the image processing unit 103.

Examples of a processing to be carried out by the image reading unit 101 include the following processings (1) to (5):
(1) a processing of reading reflected light of a document through an optical system;
(2) a processing of carrying out conversion to an electric signal through a light receiving element;
(3) a digitization processing through an A/D converter;
(4) a shading correction processing (a processing of correcting the illuminance distribution unevenness of a light source); and
(5) a scanner γ correction processing (a processing of correcting the density characteristic of a reading system)

Examples of a processing to be carried out by the image memory control unit 102 include the following processings (1) to (10):
(1) an interface control processing with a system controller;
(2) a parallel bus control processing (an interface control processing with a parallel bus);
(3) a network control processing;
(4) a serial bus control processing (a processing of controlling a plurality of external serial ports);
(5) an internal bus interface control processing (a command control processing with an operating section);
(6) a local bus control processing (an access control processing of a ROM for activating a system controller, a RAM and font data);
(7) a processing of controlling the operation of a memory module (a writing/reading control processing of a memory module or the like);
(8) an access control processing for a memory module (a processing of arranging memory access requests from a plurality of units);
(9) a data compression/reduction processing (a processing of reducing a data volume for effectively utilizing a memory); and
(10) an image edit processing (data clear of a memory area, a processing of rotating image data, an image synthesis processing on a memory or the like).

Examples of a processing to be carried out by the image processing unit 103 include the following processings (1) to (14):
(1) a shading correction processing (a processing of correcting the illuminance distribution unevenness of a light source);
(2) a scanner γ correction processing (a processing of correcting the density characteristic of a reading system)
(3) an MTF correction processing;
(4) a smoothing processing;
(5) an optional enlargement/reduction processing in a scanning direction;
(6) density conversion (γ conversion processing correspondence to density notch);
(7) a simple multivalue processing;
(8) a simple binary processing;
(9) an error diffusion processing;
(10) a dither processing;
(11) a dot layout phase control processing (right-justified dot, left justified dot);
(12) an isolated point removal processing;
(13) an image area separation processing (color discrimination, attribute discrimination, adaptive processing); and
(14) a density conversion processing.

Examples of a processing to be carried out by the image writing unit 104 include the following processings (1) to (4):
(1) an edge smoothing processing (a jaggy correction processing);
(2) a correction processing for dot relocation;
(3) a pulse control processing of an image signal; and
(4) a format conversion processing of parallel data and serial data.

Figure 2:
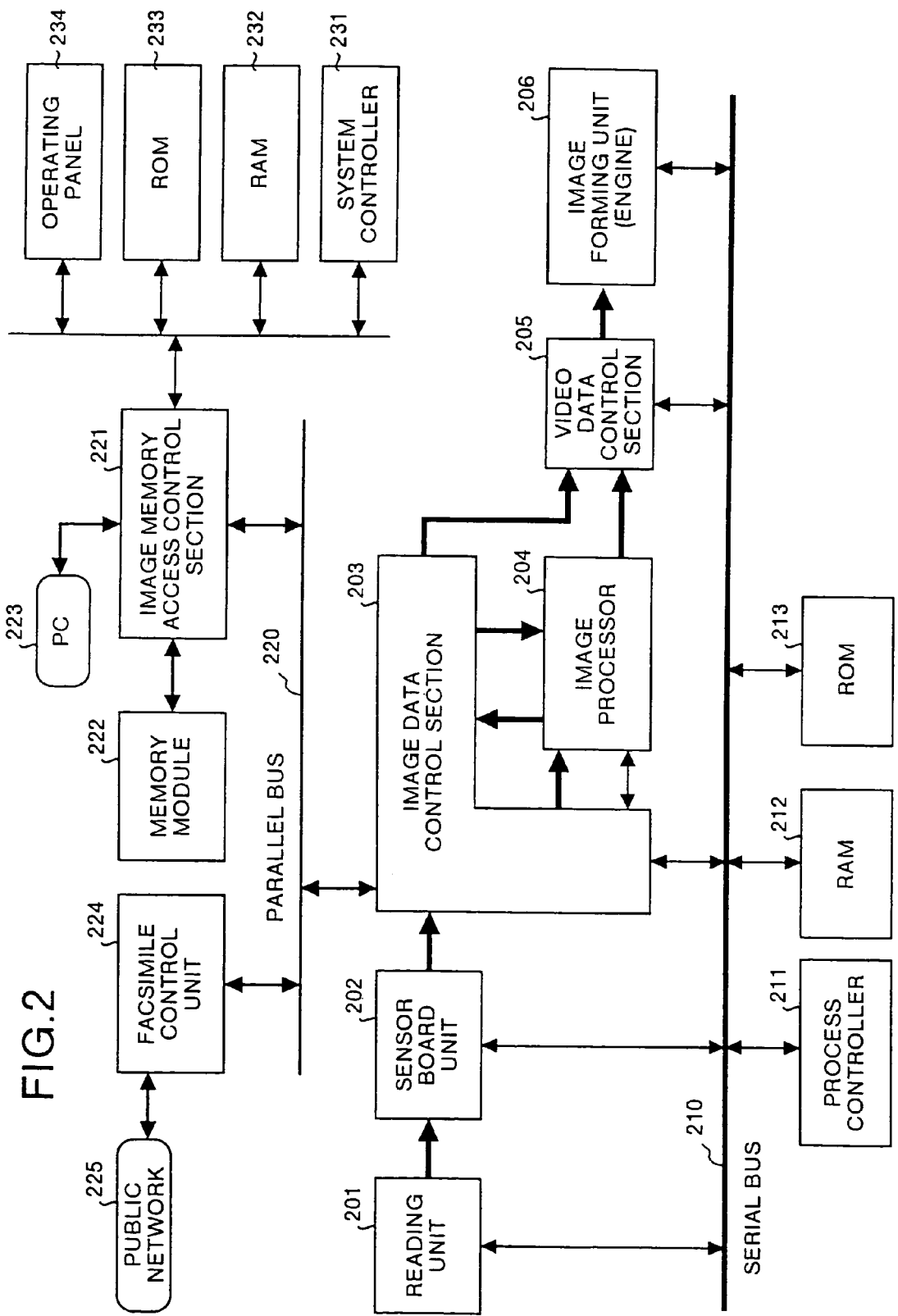
FIG. 2 is a block diagram showing an example of a hardware configuration of the image processing apparatus according to the first embodiment of the present invention.

Next, hardware configuration when the image processing apparatus according to the first embodiment is a digital composite machine will be explained. FIG. 2 is a block diagram showing an example of the hardware configuration of the image processing apparatus according to the first embodiment.

The image processing apparatus according to the first embodiment comprises a reading unit 201, a sensor board unit 202, an image data control section 203, an image processor 204, a video data control section 205 and an image forming unit (engine) 206. Moreover, the image processing apparatus comprises a serial bus 210, a process controller 211, a RAM 212 and a ROM 213.

The reading unit 201, the sensor board unit 202, the image data control section 203, the video data control section 205, the image forming unit (engine) 206, the process controller 211, the RAM 212 and the ROM 213 are mutually connected through the serial bus 210. The image processor 204 is connected to the image data control section 203 and the video data control section 205.

Furthermore, the image processing apparatus comprises a parallel bus 220, an image memory access control section 221, a memory module 222 and a facsimile control unit 224. The image memory access control section 221, the facsimile control unit 224 and the image data control section 203 are mutually connected through the parallel bus 220.

The memory module 222 is connected to the image memory access control section 221. The image memory access control section 221 is connected to an external PC (personal computer) 223. The facsimile control unit 224 is connected to a public network (PN) 225.

Moreover, the image processing apparatus comprises a system controller 231, a RAM 232, a ROM 233 and an operation panel 234. The system controller 231, the RAM 232, the ROM 233 and the operation panel 234 are connected to the image memory access control section 221.

There will be described the correspondence relationship between the components 201 to 206, 221 and 222 shown in FIG. 2 and the units 100 to 104 shown in FIG. 1. The reading unit 201 and the sensor board unit 202 function as the image reading unit 101 (see FIG. 1) to be document reading unit. Moreover, the image data control section 203 functions as the image data control unit 100 (see FIG. 1). Furthermore, the image processor 204 functions as the image processing unit 103 (see FIG. 1).

Moreover, the video data control section 205 and the image forming unit (engine) 206 function as the image writing unit 104 (see FIG. 1) to be output unit. Furthermore, the image memory access control section 221 and the memory module 222 function as the image memory control unit 102 (see FIG. 1). The memory module 222 functions as storing unit.

Next, the contents of each component of the image processing apparatus shown in FIG. 2 will be described. The reading unit 201 for optically reading a document comprises a lamp, a mirror and a lens, for example, which are not shown. The reading unit 201 has such a structure as to collect the reflected light of lamp illumination for the document into a light receiving element through the mirror and the lens.

The light receiving element is constituted by a CCD (Charge Coupled Device), for example. The CCD is mounted on the sensor board unit 202. The CCD converts, into an electric signal, a light signal obtained by the reflection through the document. The sensor board unit 202 converts, into a digital signal, image data converted into the electric signal and outputs the digital signal to the image data control section 203.

The image data control section 203 controls the transmission of the image data between a functional device (processing unit) and a data bus. The image data control section 203 carries out image data transfer among the sensor board unit 202, the parallel bus 220 and the image processor 204 and communication between the process controller 211 for the image data and the system controller 231 for managing the whole control of the image processing apparatus. The RAM 212 is used as a work area for the process controller 211. The ROM 213 stores a boot program of the process controller 211 and the like.

The image data control section 203 transfers the image data from the sensor board unit 202 to the image processor 204. The image processor 204 corrects a signal deterioration (the signal deterioration of a scanner system) with quantization to an optical system and a digital signal. Accordingly, the image processor 204 functions as image processing unit. The image processor 204 corrects the signal deterioration and then transfers the image data to the image data control section 203 again.

The image memory access control section 221 controls the operation for writing or reading the image data to or from the memory module 222. Moreover, the image memory access control section 221 controls the operation of each component connected to the parallel bus 220. The RAM 232 is used as a work area for the system controller 231. The ROM 233 stores a boot program of the system controller 231 and the like.

The operation panel 234 serves to input a processing to be carried out by the image processing apparatus. For example, the type of the processing (copy, facsimile transmission, image reading, print or the like), the number of the processings and the like are input through the operation panel 234. Consequently, image data control information is input. Therefore, the operation panel 234 functions as enlargement/reduction specifying unit.

Examples of a job to be carried out by the image processing apparatus include a job for storing the read image data in the memory module 222 and recycling the same data and a job for storing no data in the memory module 222. Each job will be described below.

Examples of the job for storing the data in the memory module 222 include a job for copying one document for a plurality of sheets. In this case, the reading unit 201 operates only once and the document is read only once. The image data thus obtained are stored in the memory module 222. Then, the stored image data are read plural times.

On the other hand, examples of the job which does not use the memory module 222 include a job for copying one document for one sheet. In this case, the image data read by the reading unit 201 are exactly reproduced by the image forming unit 206. Accordingly, the image memory access control section 221 does not access the memory module 222.

Description will be given about the data flow for each of the job for storing the image data in the memory module 222 and the job which does not use the memory module 222. To begin with, the jobs which do not use the memory module 222 will be explained.

The data transferred from the image processor 204 to the image data control section 203 are transferred from the image data control section 203 to the image processor 204 again. The image processor 204 carries out a picture quality processing for converting luminance data of the CCD of the sensor board unit 202 into an area gradation.

After the picture quality processing is completed, the image data are transferred from the image processor 204 to the video data control section 205. The video data control section 205 carries out a post-processing related to a dot layout and pulse control for reproducing a dot for the signal changed into the area gradation. Then, a reproduced image is formed on a transfer paper in the image forming unit 206.

Next, description will be given about the flow of the image data flow obtained in the case of an additional processing, for example, rotation in the image direction, the synthesis of an image or the like is carried out when the image data are stored in the memory module 222 and are read therefrom. The image data transferred from the image processor 204 to the image data control section 203 are sent from the image data control section 203 to the image memory access control section 221 through the parallel bus 220.

The image memory access control section 221 serves to carry out the access control of the image data and the memory module 222, the expansion of data for print of the external PC (personal computer) 223 and the compression/reduction of image data for effective utilization of the memory module 222 based on the control of the system controller 231.

The image data transmitted to the image memory access control section 221 are stored in the memory module 222 after the data compression. The stored image data are read to the image memory access control section 221 if necessary. The image memory access control section 221 extends the read image data and returns the same data to original image data. The image data are then transferred from the image memory access control section 221 to the image data control section 203 through the parallel bus 220.

The data transferred to the image data control section 203 are transferred to the image processor 204. The image data subjected to a picture quality processing in the image processor 204 are transferred to the video data control section 205. In the video data control section 205, pulse control is carried out for the image data. Then, a reproduced image is formed on the transfer paper in the image forming unit 206.

In the flow of the image data, the function of the digital composite machine is implemented by bus control in the parallel bus 220 and the image data control section 203. The facsimile transmitting function carries out an image processing for the read image data by the image processor 204 and transfers the image data to the facsimile control unit 224 through the image data control section 203 and the parallel bus 220. The facsimile control unit 224 carries out data conversion to a communicating network and transmits facsimile data to the public network (PN) 225.

For the received facsimile data, the facsimile control unit 224 converts, into image data, line data sent from the public network (PN) 225. The changed image data are transferred to the image processor 204 through the parallel bus 220 and the image data control section 203. The image processor 204 transfers the image data to the video data control section 205 without carrying out a special picture quality processing. The video data control section 205 carries out dot relocation and pulse control for the image data. Then, a reproduced image is formed on the transfer paper in the image forming unit 206.

In such a situation that a plurality of jobs, for example, in that the copy function, the facsimile transmitting and receiving function and a printer output function are operated at the same time, the allocation to the job of the use of the reading unit 201, the image forming unit 206 and the parallel bus 220 is controlled in the system controller 231 and the process controller 211.

The process controller 211 controls an image data flow, and the system controller 231 controls the whole system and manages the activation of each resource. Moreover, the functional selection of the digital composite machine carries out selective input in the operation panel 234 of the operating section and sets the contents of the processing such as a copy function or a facsimile function.

The system controller 231 and the process controller 211 mutually carry out communication through the parallel bus 220, the image data control section 203 and the serial bus 210. More specifically, data format conversion for a data interface with the parallel bus 220 and the serial bus 210 is carried out in the image data control section 203. Thus, the communication between the system controller 231 and the process controller 211 is carried out.

Figure 3:
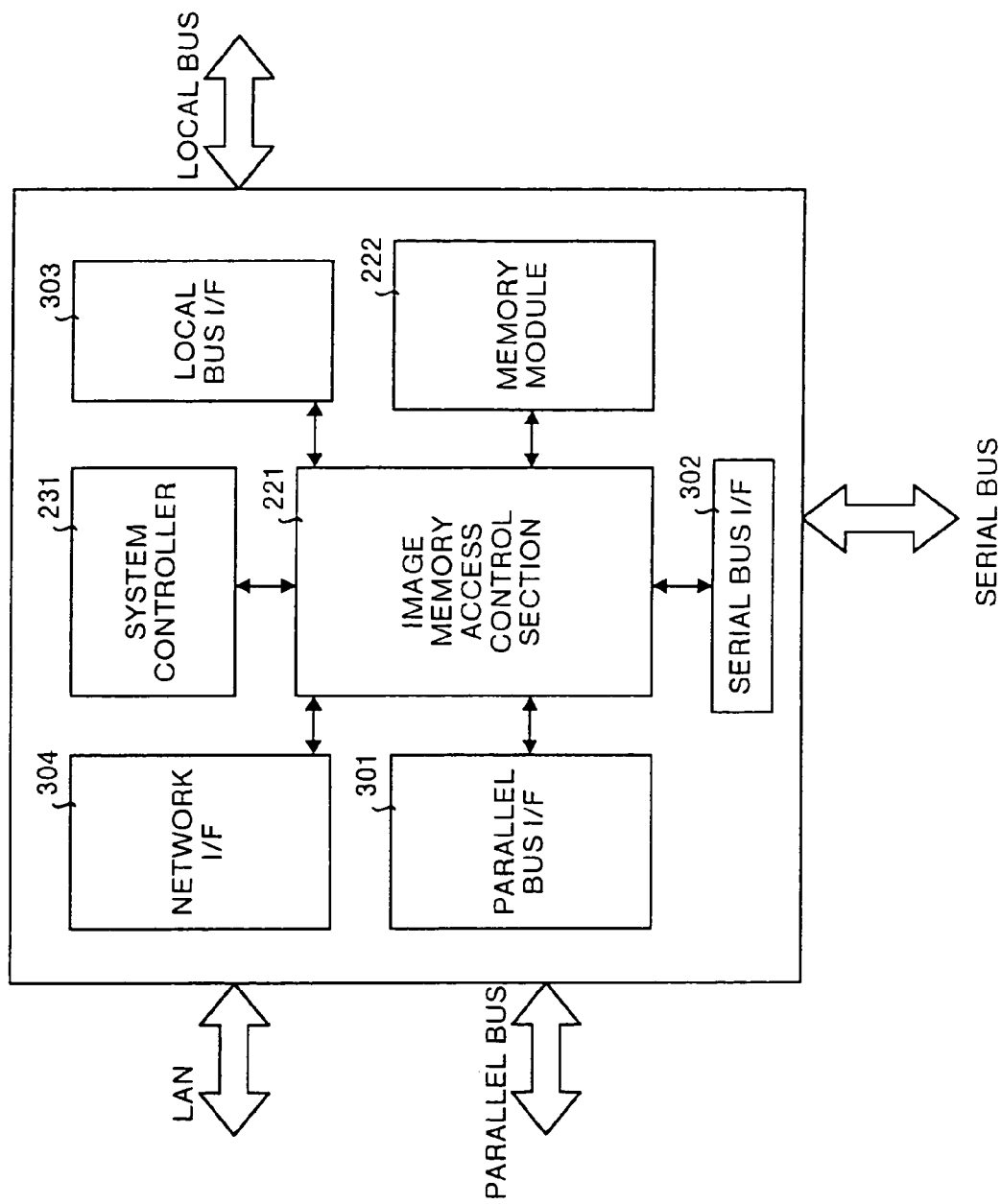
FIG. 3 is a diagram showing a structure of a controller unit for carrying out system control and memory control of the image processing apparatus according to the first embodiment of the present invention.

FIG. 3 is a diagram showing the structure of a controller unit for carrying out system control and memory control. The controller unit is constituted by collecting the system controller 231 for controlling the movement of the whole image processing apparatus, the memory module 222, the image memory access control section 221 and various bus interfaces (I/F).

The various bus interfaces, for example, the parallel bus interface 301, the serial bus interface 302, the local bus interface 303 and the network interface 304 are connected to the image memory access control section 221. The controller unit is connected to a related unit through plural kinds of buses in order to maintain independence in the whole image processing apparatus.

The system controller 231 carries out the control of other functional units through the parallel bus 220. Moreover, the parallel bus 220 serves to transfer the image data. The system controller 231 gives, to the image data control section 203, an operation control instruction for storing the image data in the memory module 222. The operation control instruction is transmitted through the image memory access control section 221, the parallel bus interface 301 and the parallel bus 220.

In response to the operation control instruction, the image data are transmitted from the image data control section 203 to the image memory access control section 221 through the parallel bus 220 and the parallel bus interface 301. The image data are stored in the memory module 222 through the control of the image memory access control section 221.

On the other hand, the controller unit shown in FIG. 3 functions as a printer controller and the network control and serial bus control when a call is sent as a printer function from the PC (personal computer) 223. The image memory access control section 221 receives print output request data through the network interface 304.

In the case of general-purpose serial bus connection, the image memory access control section 221 receives print output request data through the serial bus interface 302. The general-purpose serial bus interface 302 corresponds to plural kinds of standards, for example, corresponds to an interface having a standard such as USB (Universal Serial Bus), 1284 or 1394.

The print output request data are expanded into image data through the system controller 231. A destination for the expansion is an area in the memory module 222. Font data necessary for the expansion are obtained by referring to a font ROM (including the ROM 233 in FIG. 2) through the local bus interface 303 and the local bus. The local bus is connected to the ROM 233 and the RAM 232 which are required for the control of the controller unit.

Referring to the serial bus, there is also an interface for transfer with the operation panel 234 to be the operating section of the image processing apparatus other than the external serial port for connection with the PC (personal computer) 223. This is not the print expansion data but communication with the system controller 231 is carried out through the image memory access control section 221 to accept a processing procedure and display the state of the system.

The data transmission and receipt between the system controller 231 and the memory module 222 and various buses is carried out through the image memory access control section 221. The job using the memory module 222 is managed singly in the whole image processing apparatus.

In the image processing apparatus according to the present embodiment, a performance related to the data access is changed by only exchanging the controller unit shown in FIG. 3. Referring to application for each performance of the controller unit, moreover, an optimal unit can be constituted in respect of both a cost required for the image processing apparatus and the performance by properly selecting the performance of the system controller 231 unit, the memory capacity of the memory module 222 and the access speed of the memory.

Figure 4:
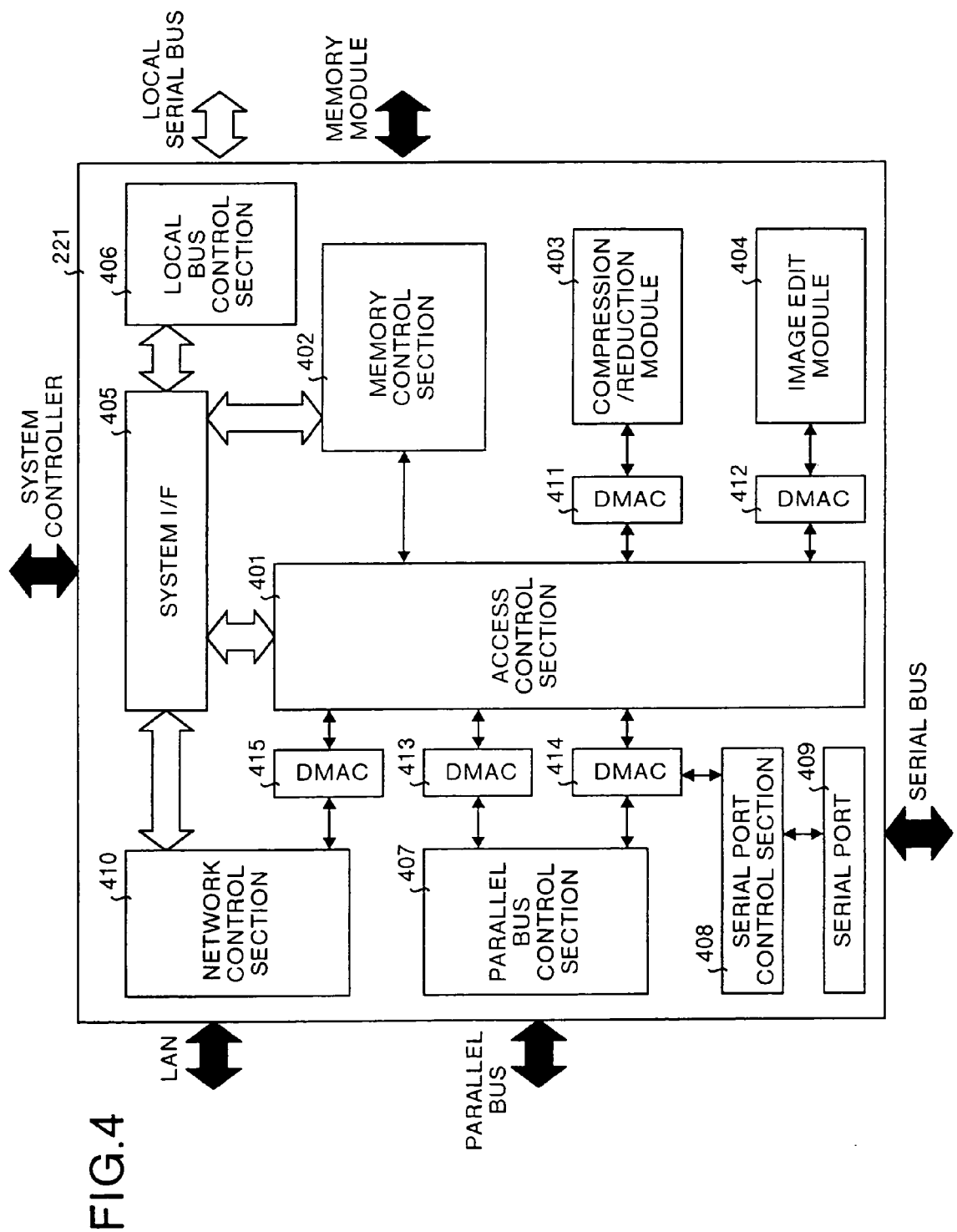
FIG. 4 is a diagram showing a schematic block structure of an image memory access control section according to the first embodiment of the present invention.

FIG. 4 is a diagram showing the schematic block structure of the image memory access control section 221. The image memory access control section 221 comprises an image control section 401, a memory control section 402, a compression/reduction module 403, an image edit module 404, a system interface 405, a local bus control section 406, a parallel bus control section 407, a serial port control section 408, a serial port 409 and a network control section 410.

The compression/reduction module 403, the image edit module 404, the parallel bus control section 407, the serial port control section 408 and the network control section 410 are connected to the access control section 401 through DMACs (direct memory access controllers) 411, 412, 413, 414 and 415, respectively.

The system interface 405 transmits and receives an instruction or data to and from the system controller 231 (see FIG. 3). Basically, the system controller 231 controls the whole image processing apparatus. Moreover, the system controller 231 manages the resource distribution of a memory. Other units are controlled in the parallel bus 220 through the system interface 405 and the parallel bus control section 407.

Each unit of the image processing apparatus is basically connected to the parallel bus 220. Accordingly, the parallel bus control section 407 manages the transmission and receipt of the data to and from the system controller 231 and the memory module 222 through bus occupied control.

The network control section 410 controls the connection with a LAN (local area network). The network control section 410 manages the transmission and receipt of the data to and from an external extender connected to the network. The system controller 231 is not concerned with the operation management of connected equipment on the network but controls an interface in the image memory access control section 221. In the first embodiment, control for 100BASE-T is added, which is not particularly restricted.

The serial port 409 connected to the serial bus includes a plurality of ports. The serial port control section 408 includes port control mechanisms corresponding to the number of the types of prepared buses. In the first embodiment, port control for USB and 1284 is carried out, which is not particularly restricted. Moreover, the transmission and receipt of data related to the command acceptance through the operating section or display is carried out separately from the external serial port.

The local bus control section 406 carries out an interface with a local serial bus to which the RAM 232 necessary for activating the system controller 231, the ROM 233 and the font ROM for expanding printer code data are connected.

For the operation control, command control sent from the system interface 405 to the system controller 231 is carried out. The data control manages a memory access sent from the external unit by mainly using the memory module 222. The image data are transferred from the image data control section 203 (see FIG. 2) to the image memory access control section 221 through the parallel bus 220. Then, the same image data are fetched into the image memory access control section 221 through the parallel bus control section 407.

The memory access of the image data thus fetched is not managed by the system controller 231 any longer. In other words, the memory access is carried out through direct memory access control independently of the system control. For an access to the memory module 222, the access control section 401 arranges an access request sent from a plurality of units. Then, the memory control section 402 controls the access operation of the memory module 222 and the operation for reading/writing data.

When the memory module 222 is accessed from the network, the data fetched from the network into the image memory access control section 221 through the network control section 410 are transferred to the memory module 222 through the direct memory access control. The access control section 401 arranges the access to the memory module 222 through a plurality of jobs. The memory control section 402 reads/writes data from/to the memory module 222.

When the memory module 222 is accessed from the serial bus, the data fetched from the serial port control section 408 into the image memory access control section 221 through the serial port 409 are transferred to the memory module 222 through the direct memory access control. The access control section 401 arranges an access to the memory module 222 through a plurality of jobs. The memory control section 402 reads/writes data from/to the memory module 222.

Print output data sent from the personal computer 223 connected to the network or the serial bus are expanded into a memory area in the memory module 222 by using font data on the local bus through the system controller 231.

An interface with each external unit is managed by the system controller 231. For the transfer of the data fetched into the image memory access control section 221, the respective DMACs 411, 412, 413, 414 and 415 manage a memory access. In this case, each of the DMACs 411, 412, 413, 414 and 415 executes the data transfer independently. Therefore, the access control section 401 gives a priority to the collision of the jobs for an access to the memory module 222 or each access request.

The access to the memory module 222 includes an access from the system controller 231 through the system interface (system I/F) 405 for the bit map expansion of stored data in addition to the access of each of the DMACs 411, 412, 413, 414 and 415.

The DMAC data permitted to access the memory module 222 in the access control section 401 or data transmitted from the system interface 405 are directly transferred to the memory module 222 through the memory control section 402.

The image memory access control section 221 has the compression/reduction module 403 and the image edit module 404 for a data processing therein. The compression/reduction module 403 serves to compress and extend the image data or the code data such that the data can be effectively stored in the memory module 222. The compression/reduction module 403 controls an interface with the memory module 222 through the DMAC 411.

The image data stored once in the memory module 222 are called from the memory module 222 to the compression/reduction module 403 through the memory control section 402 and the access control section 401 by the direct memory access control. The converted image data are returned to the memory module 222 or output to an external bus through the direct memory access control.

The image edit module 404 controls the memory module 222 through the DMAC 412 to carry out a data processing in the memory module 222. More specifically, the image edit module 404 carries out a rotation processing of the image data, synthesis of different images and the like as a data processing in addition to the clear operation of a memory area. The image edit module 404 carries out edit for converting data to be processed through the address control on the memory.

The image edit module 404 carries out a processing for a bit map image expanded onto the memory module 222. The image edit module 404 cannot edit the code data and the printer code data which are obtained after the compression. Accordingly, image compression for effective memory storage is carried out for the data obtained after the image edit.

Figure 5:
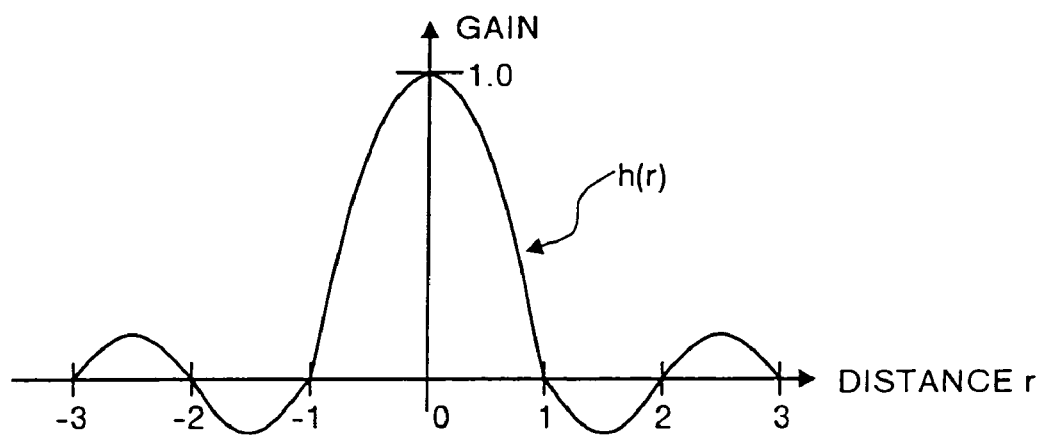
FIG. 5 illustrating the summary of an interpolating function.

An interpolating function will be described below. FIG. 5 illustrating the summary of the interpolating function. The sampling of an analog signal is carried out at a repetitive frequency which is double the maximum frequency or more included in a continuous time signal based on a sampling theorem and aliasing is not generated.

The enlargement/reduction of the image data interpolates necessary data through the resampling of the sampling signal. When the digitized sampling signal is subjected to a convolutional operation through a sampling function $h(r)$ shown in FIG. 5, the continuous signal is completely reconstituted. In an enlargement processing, a large number of resampling points are set and data are reconfigured. During the reduction, a sampling space is enlarged and sampling data are reduced.

A sampling point r takes a discrete value for the digitized data and a difference sampling point r' does not need to be an integer. If the digitized input data are represented as $f(r)$ and the resampling data are represented as g(r), g(r) is calculated in the following equation:

$$g(r) = f \times h(r)$$

wherein "x" represents a convolutional operation. Thus, the sum of a product with peripheral data is obtained.

FIG. 5 shows a gain characteristic one-dimensionally. The gain characteristic related to a distance r can be held on a two-dimensional plane. A three-dimensional solid figure can be obtained, which is not shown.

Interpolation data are generated by some approximations other than a calculation based on a sampling function. In particular, an approximate expression is used because of limitations on the hardware configuration in many cases. Examples of the approximations include a nearest pixel replacement method, and furthermore, a near pixel distance linear distribution method and a tertiary function convolutional operation method related to the sampling function.

In the nearest pixel replacement method, replacement with the nearest original input data to the resampling point is carried out. In the near pixel distance linear distribution method, a density level is distributed depending on a distance between the resampling point and the adjacent pixel of original image data. In the tertiary function convolutional operation method, a sampling function based on a trigonometric function is approximated with the tertiary function and is used for the interpolating calculation of the density distribution of the adjacent pixel to the resampling position. This is an approximate calculation for the hardware and is based on the picture quality, the amount of a hardware configuration and trade off.

Figure 6:
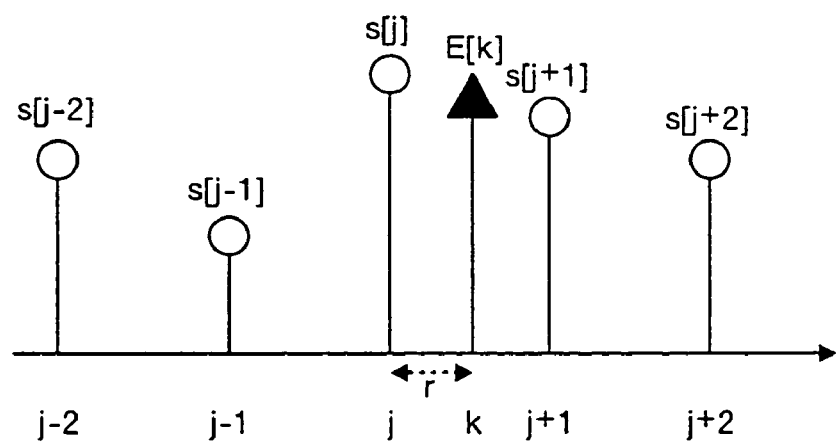
FIG. 6 is a diagram illustrating the summary of interpolation for a resampling position in a one dimension.
Figure 7:
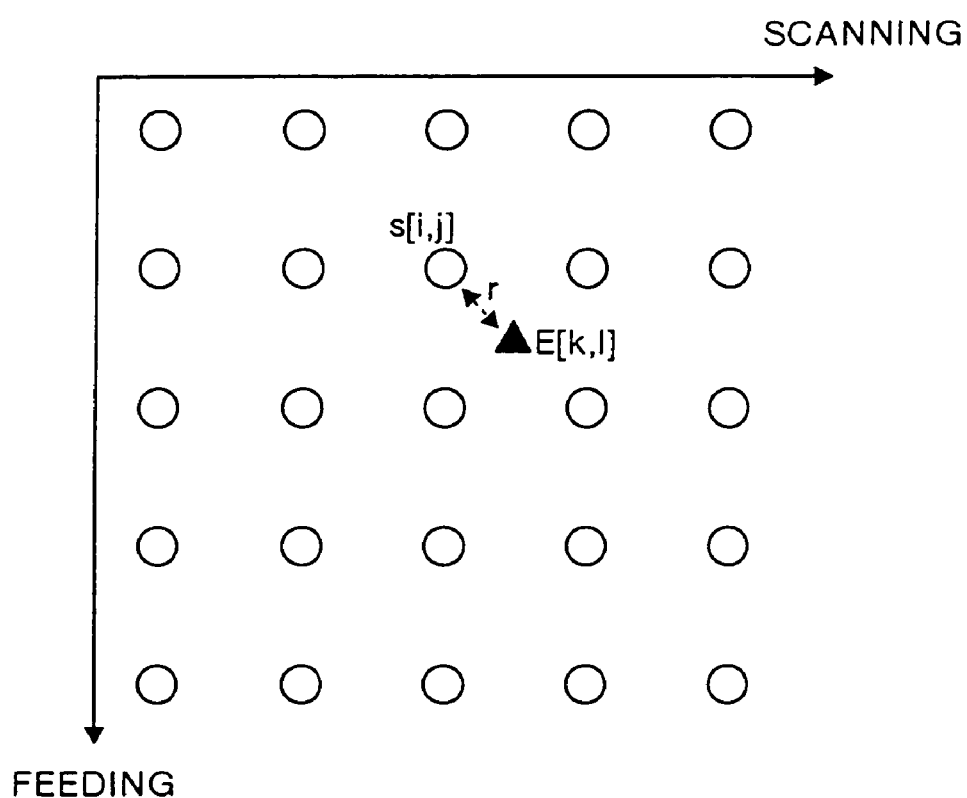
FIG. 7 is a diagram illustrating the summary of interpolation for a resampling position in two dimensions.

FIG. 6 and FIG. 7 are diagrams illustrating the summary of the interpolation for the resampling position in one and two dimensions, respectively. In the operation processing to be carried out by using an operation processor and a controller, the approximate limitations on the hardware configuration are eliminated. Although the compensation range of operational precision for a calculating time is restricted, computational precision can be enhanced with a programmable configuration. A preprocessing circuit in the image data control section 203 has a hardware configuration and does not always have computational precision which is coincident with that of the programmable operation processing.

In FIG. 6, a white circle represents original image data and a density at a position j is represented as S[j]. A black triangle represents interpolation data E[k] at a resampling point k. E[k] is obtained by multiplying a weighting factor h(r) based on a distance r between S[j] and k and calculating the sum within a range in which a pixel correlation is eliminated.

In FIG. 7, an original image S[i, j] is sampled at regular intervals in a scanning direction and a feeding direction. If an interpolation pixel E[k, l] on a certain resampling point is indicated as a black triangular point, E[k, l] is obtained by multiplying the weighting factor h(r) based on the distance r between E[k, l] and S[i, j] and calculating the sum within a plane range in which the pixel correlation is eliminated.

The distance r is decomposed into the scanning direction and the feeding direction and can be represented by a product of a sampling function for the scanning direction and a sampling function for the feeding direction. Vector information about a distance is divided and a weighting calculation is carried out based on a sampling function for a direction of each axis to obtain a product. Within the range which the pixel correlation reaches, the weighting calculation for an original image is carried out to obtain the sum. Thus, the interpolation data are calculated.

A resampling position is calculated for the enlargement and reduction, a weighting calculation based on the sampling function is carried out and a convolutional operation is executed. Referring to a calculation range, if a programmable processor is used, calculation limitations are not generated through hardware restrictions so that the resampling calculation can be carried out with high precision.

Figure 8:
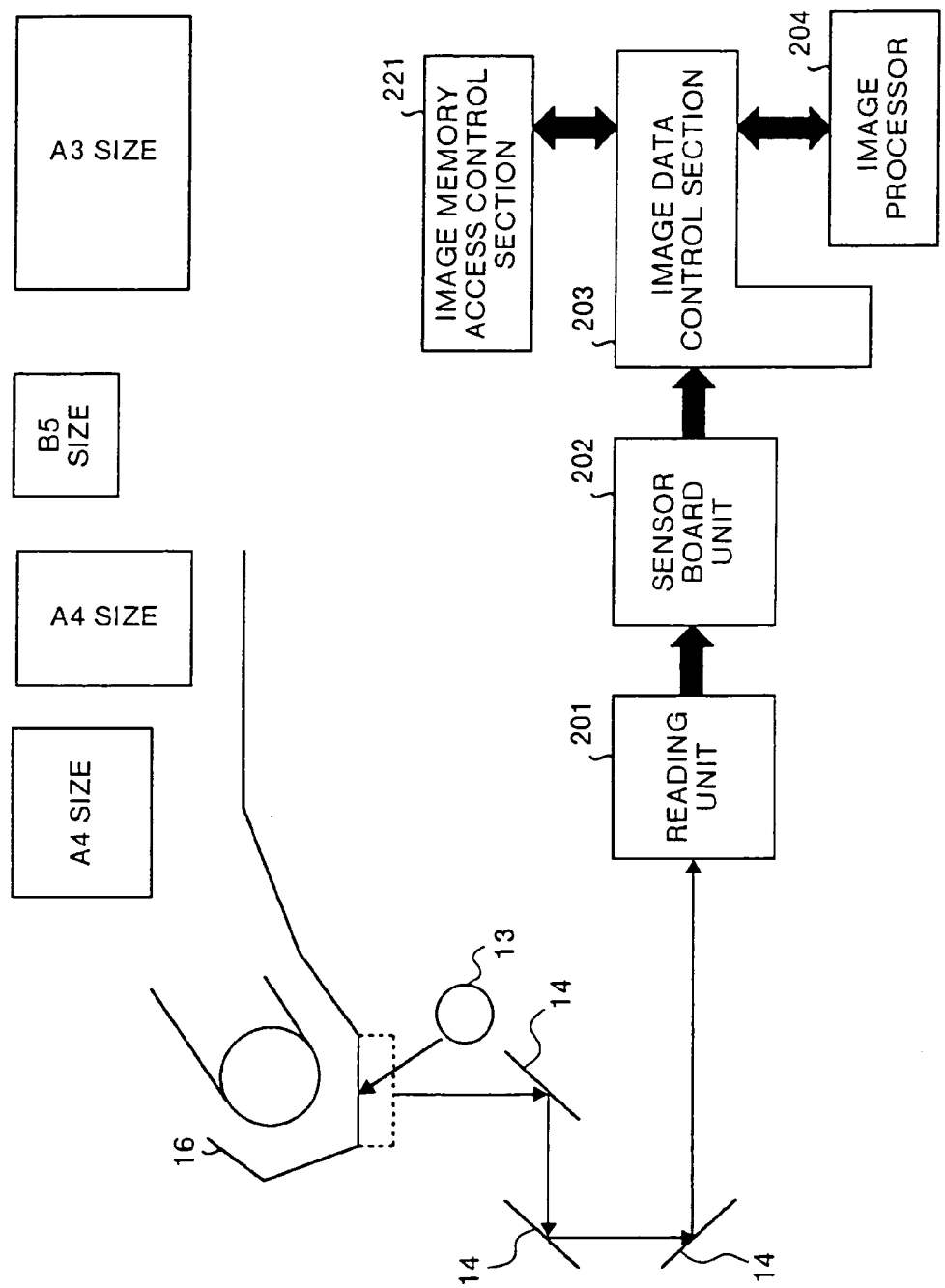
FIG. 8 is a diagram schematically showing a data flow obtained when documents having various sizes are to be read by using a sheet through document feeder according to the first embodiment.

Next, the summary of a processing of reading a document by using the sheet through document feeder according to the first embodiment will be explained. FIG. 8 is a diagram schematically showing a data flow obtained when documents having different sizes are read by using the sheet through document feeder according to the first embodiment.

Figure 9:
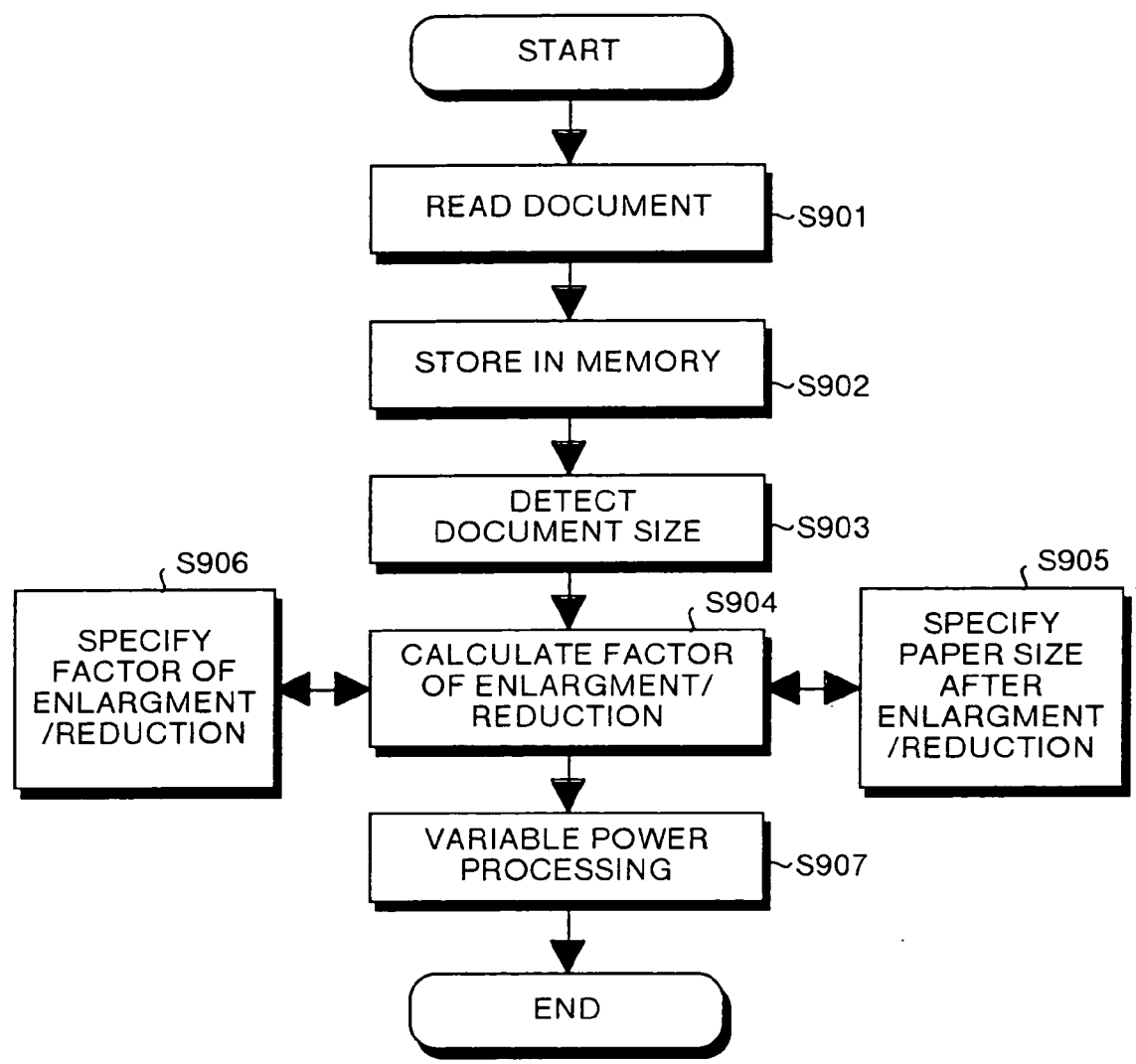
FIG. 9 is a flowchart showing a processing of reading the documents having various sizes by using the sheet through document feeder according to the first embodiment.

In FIG. 8, the reference numeral 13 denotes an illumination lamp 13, the reference numeral 14 denotes a mirror group, and the reference numeral 16 denotes a sheet through document feeder. Moreover, FIG. 9 is a flowchart showing a processing of reading documents having different sizes by using the sheet through document feeder according to the first embodiment.

As shown in FIG. 8, generally, when the sheet through document feeder has documents having completely different sizes such as A4 wide, A4 long, B5 wide or A3 wide, the setting of a enlargement/reduction mode is not initialized even if the document size is varied. In the first embodiment, all the documents are read at a size which is the same as their original size (hereafter, equimultiple) as shown in FIG. 9 (Step S901). The image data of the read document are stored in the memory module 222 (Step S902).

Size information about the read document is detected and is stored in the memory module 222 together with corresponding image data. The size information may be extracted from, for example, a mechanical sensor of the document feeder. The extracted size information is added as an index. Alternatively, a document size is detected based on a difference from a background density on a document surface to be read and is added as an area signal.

Subsequently, the size information added to the image data is extracted from the memory module 222 in order to calculate a desirable enlargement/reduction factor (Step S903). Then, the enlargement/reduction factor is calculated based on the document size (Step S904). The enlargement/reduction factor may be set in two ways. First, the enlargement/reduction factor may be set by specifying the paper size after enlargement/reduction (Step S905).

In this case, the enlargement/reduction factors in the scanning and feeding directions are calculated from the size of the read document and the specified size after enlargement/reduction. Second, the enlargement/reduction factor itself may be set using the keys on the operation panel 234 of the operating section (Step S906).

Once the enlargement/reduction factor is calculated, a parameter of enlargement/reduction control is set to a processing module with the enlargement/reduction factor, the data interpolation of the image data is carried out so that the enlargement/reduction processing is executed (Step S907). For example, if a reduction is carried out with scanning and feeding of 50%, a pixel is resampled with a skip of one pixel in the respective directions. If an enlargement is carried out with scanning and feeding of 200%, the resampling is carried out with a half pitch of a pixel interval in the respective directions.

Figure 10:
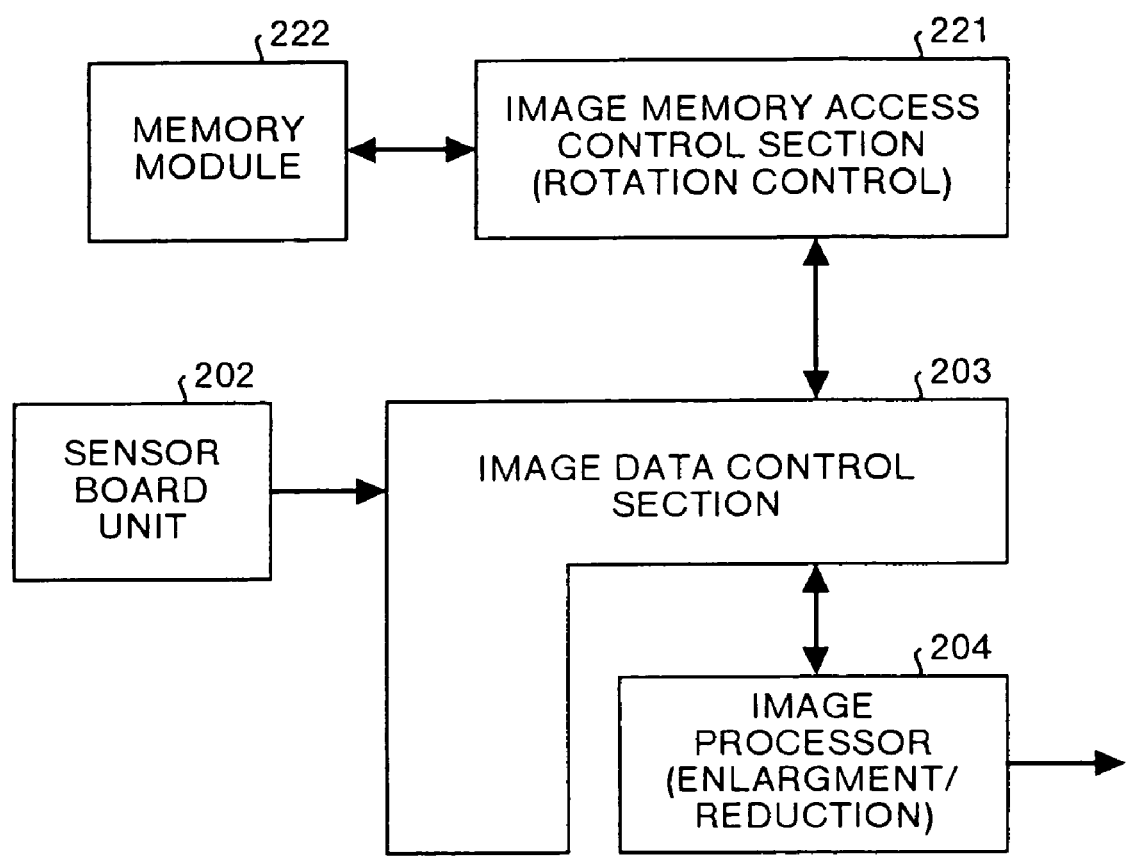
FIG. 10 is a diagram schematically illustrating a data flow in an electrical enlargement/reduction processing according to the first embodiment.

Next, the electrical enlargement/reduction processing according to the first embodiment will be described in detail. FIG. 10 is a diagram schematically showing a data flow obtained in the electrical enlargement/reduction processing according to the first embodiment. The image processor 204 includes a convolutional operation module for carrying out a enlargement/reduction processing in a one-dimensional direction. The convolutional operation module is constituted by a programmable method.

Accordingly, the image processor 204 functions as relocation data calculating unit (enlargement/reduction unit). The image data control section 203 carries out only a data interface function. The image memory access control section 221 carries out the memory access control and rotates the image data by 90 degrees. Accordingly, the image memory access control section 221 functions as image rotating unit.

Figure 11:
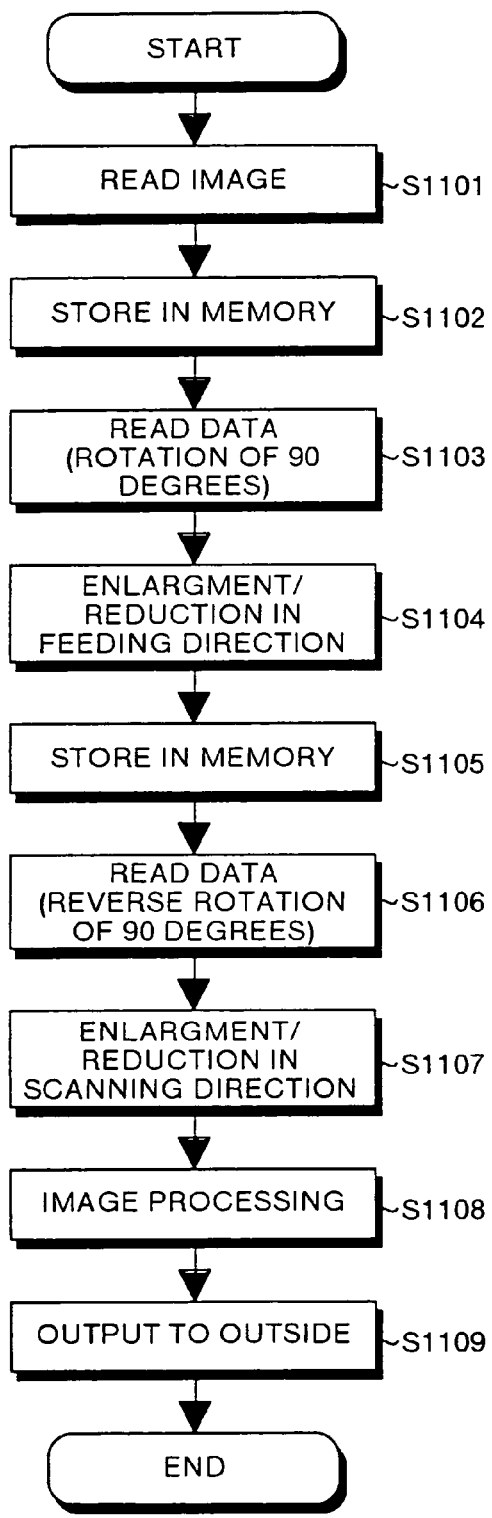
FIG. 11 is a flowchart showing the procedure for the electrical enlargement/reduction processing according to the first embodiment.

FIG. 11 is a flowchart showing the procedure for the electrical enlargement/reduction processing according to the first embodiment. In the sensor board unit 202, all the documents are read with an equimultiple (Step S1101). In that case, the sensor board unit 202 carries out shading correction. Thus, an image deterioration caused by illuminance unevenness is corrected in advance.

The read image data are stored in the memory module 222 managed by the image memory access control section 221 (Step S1102). In that case, the document size is detected and is then stored as additional information in the memory module 222 together with the image data.

Subsequently, the image data are readout (Step S1103).

In that case, the read image data are rotated by 90 degrees in the image memory access control section 221. When the document is read by using the sheet through document feeder, a lateral inverted image is subjected to a mirroring processing and is then rotated by 90 degrees.

The image data thus rotated are transferred to the image processor 204 through the image data control section 203. In the image processor 204, an interpolating operation for a resampling position is carried out to execute a enlargement/reduction processing in the feeding direction (Step S1104). A parameter of the interpolating operation is calculated by the process controller 211 based on the storage of the image data and the enlargement/reduction range and a desirable setting operation in the image processor 204 is completed in advance. Accordingly, the process controller 211 functions as enlargement/reduction factor calculating unit.

The image data which have been subjected to the interpolating operation are stored in the memory module 222 controlled by the image memory access control section 221 through the image data control section 203 again (Step S1105). In that case, an MTF correction processing in the same direction as the enlargement/reduction direction can be carried out.

The image data (a enlargement/reduction is carried out in only the feeding direction) stored in the memory module 222 are read again for a enlargement/reduction in the scanning direction (Step S1106). Since the image data thus read are rotated by 90 degrees at the Step S1103, they are rotated by 90 degrees in a reverse direction in the image memory access control section 221. In other words, the same direction as that of an original document is set.

Subsequently, the image data are transferred to the image processor 204 through the image data control section 203 to carry out the enlargement/reduction processing in the scanning direction in the image processor 204 (Step S1107). The enlargement/reduction processing is carried out by downloading a set value for a scanning enlargement/reduction from the process controller 211 and calculating the image data based on the interpolating operation.

For the image data which have completely been subjected to the electrical enlargement/reduction processing in both the scanning and feeding directions, a necessary processing procedure is downloaded from the process controller 211 to carry out an image processing such as MTF correction or a gradation processing through the programmable operation processor (Step S1108). Then, the data which have completely been subjected to the image processing are output to the outside of the image processor 204 (Step S1109). When the image data is to be output to a transfer paper, pulse control is carried out in the video data control section 205 and an image is formed in the image forming unit 206.

According to the first embodiment, the documents having different sizes are read by the reading unit 201 and the sensor board unit 202, the read image data are once stored in the memory module 222 and the electrical enlargement/reduction processing is also carried out in both the scanning and feeding directions. Therefore, even if the documents having different sizes are mixed, they can be read by means of the sheet through document feeder. Accordingly, it is not necessary to use a mechanical enlargement/reduction mechanism for controlling a document feeding speed differently from the conventional art.

According to the first embodiment, the image processor 204 carries out the enlargement/reduction processing in the one-dimensional direction and the image memory access control section 221 rotates the image data by 90 degrees. Therefore, the enlargement/reduction mechanism can be aggregated into one place. Accordingly, the processing module can be utilized effectively.

Figure 12:
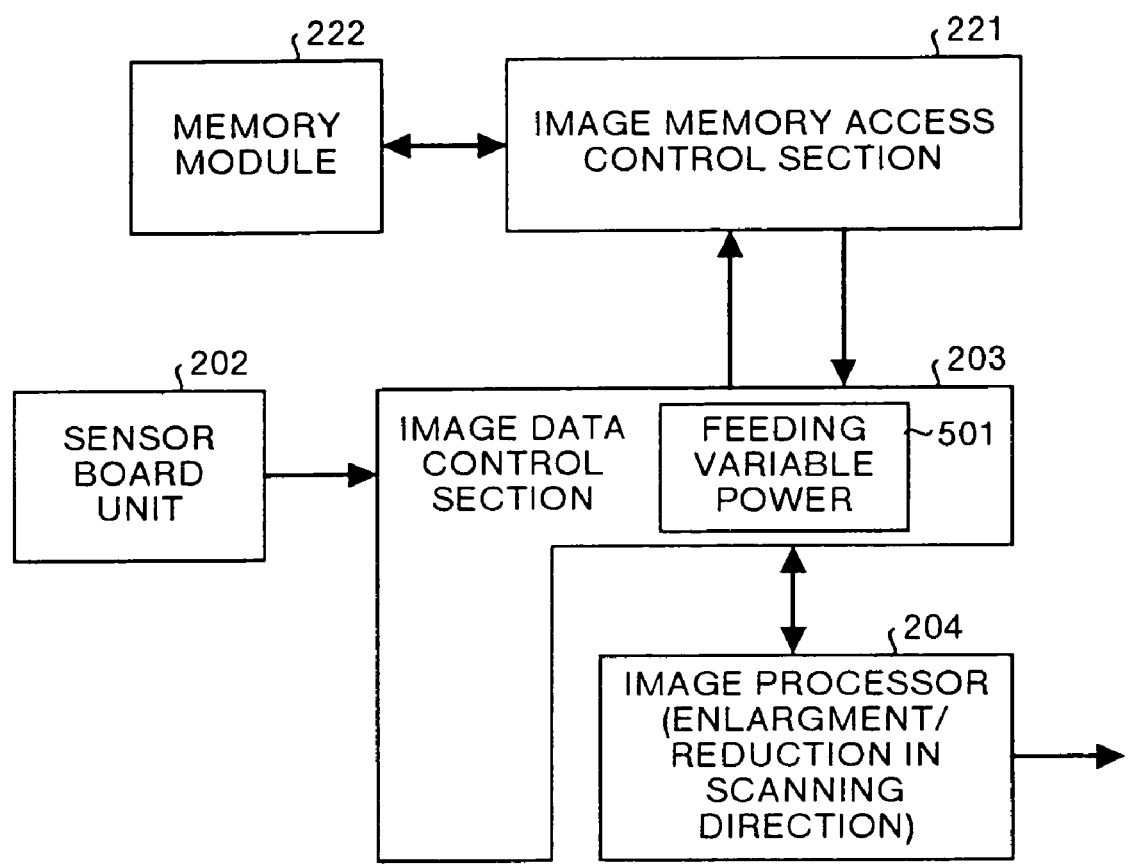
FIG. 12 is a diagram schematically illustrating a data flow in an electrical enlargement/reduction processing according to a second embodiment.

FIG. 12 is a diagram schematically showing a data flow obtained in an electrical enlargement/reduction processing according to a second embodiment. The second embodiment is different from the first embodiment in that an image data control section 203 includes a module 501 for carrying out a enlargement/reduction processing in a feeding direction and the module 501 carries out a enlargement/reduction processing in a feeding direction, an image processor 204 carries out a enlargement/reduction processing in a scanning direction, and an image memory access control section 221 does not carry out the rotation control of image data.

In the second embodiment, accordingly, the module 501 functions as first relocation data calculating unit and the image processor 204 functions as second relocation data calculating unit. Since other structures are the same as those of the first embodiment, repetitive description will be omitted and only differences will be explained below.

Figure 13:
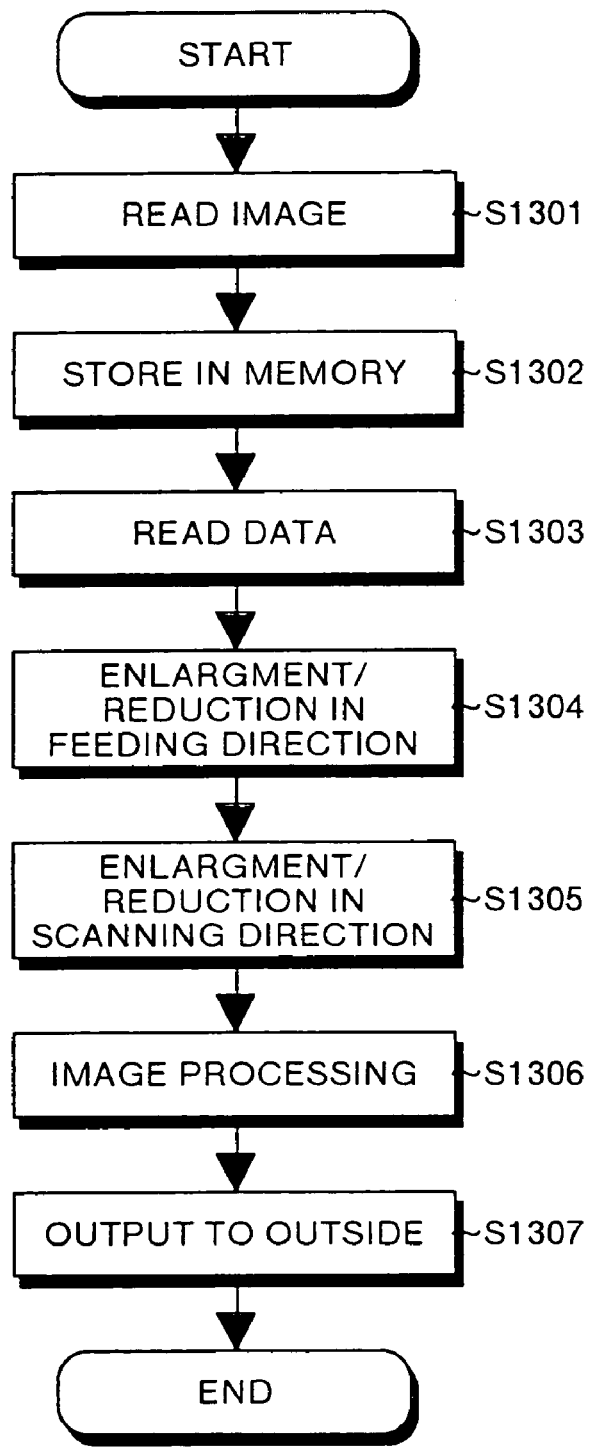
FIG. 13 is a flowchart showing the procedure for an electrical enlargement/reduction processing according to the second embodiment.

FIG. 13 is a flowchart showing a procedure for the electrical enlargement/reduction processing according to the second embodiment.

When the sheet through document feeder is used, a document is read with an equimultiple in a pressure plate mode (Step S1301). The read image data are stored in the memory module 222 through the image data control section 203 and the image memory access control section 221 (Step S1302).

In that case, a document size is detected and information about the document size is stored as an index in the memory module 222 together with corresponding image data. In the process controller 211, moreover, a parameter for an operation processing is calculated based on size information about the index and indicating conditions of a enlargement/reduction and is set to the image data control section 203 and the image processor 204.

Subsequently, the image data stored in the memory module 222 are read out (Step S1303). For the read image data, a enlargement/reduction processing in the feeding direction is carried out in the image data control section 203 (Step S1304). Then, the image data are transferred to the image processor 204 to carry out a enlargement/reduction processing in the scanning direction (Step S1305).

For the image data which have completely been subjected to the enlargement/reduction processing in both the scanning and feeding directions, a predetermined image processing is carried out through an operation processor of the image processor 204 based on other image processing programs set by the process controller 211 (Step S1306). Then, the data which have completely been subjected to the image processing are output to the outside of the image processor 204 (Step S1307).

According to the second embodiment, the enlargement/reduction processing in the feeding direction is carried out through the image data control section 203 and the enlargement/reduction processing in the scanning direction is carried out through the image processor 204. Therefore, the enlargement/reduction processing in the feeding direction and the enlargement/reduction processing in the scanning direction can be carried out at the same time. Accordingly, the concurrent operation of a system can be applied without a reduction in a processing performance. Consequently, the efficiency of the concurrent operation can be controlled.

More specifically, when two documents are read, for example, the enlargement/reduction processing in the feeding direction can be carried out for a second document which have been read later in the image data control section 203 immediately after the enlargement/reduction processing in the feeding direction for a first document which has been read earlier is completed and the image data are transferred from the image data control section 203 to the image processor 204.

When the memory access control section 221 is constituted to carry out the rotation control of the image data in the same manner as that in the first embodiment, during the execution of an image processing for the first document through the image processor 204, the image data which have completely been subjected to the enlargement/reduction processing in the feeding direction may be transferred to the image memory access control section 221 again in the image data control section 203 and may be rotated by 90 degrees and the power variable processing in the scanning direction may be carried out again in the image data control section 203.

Figure 14:
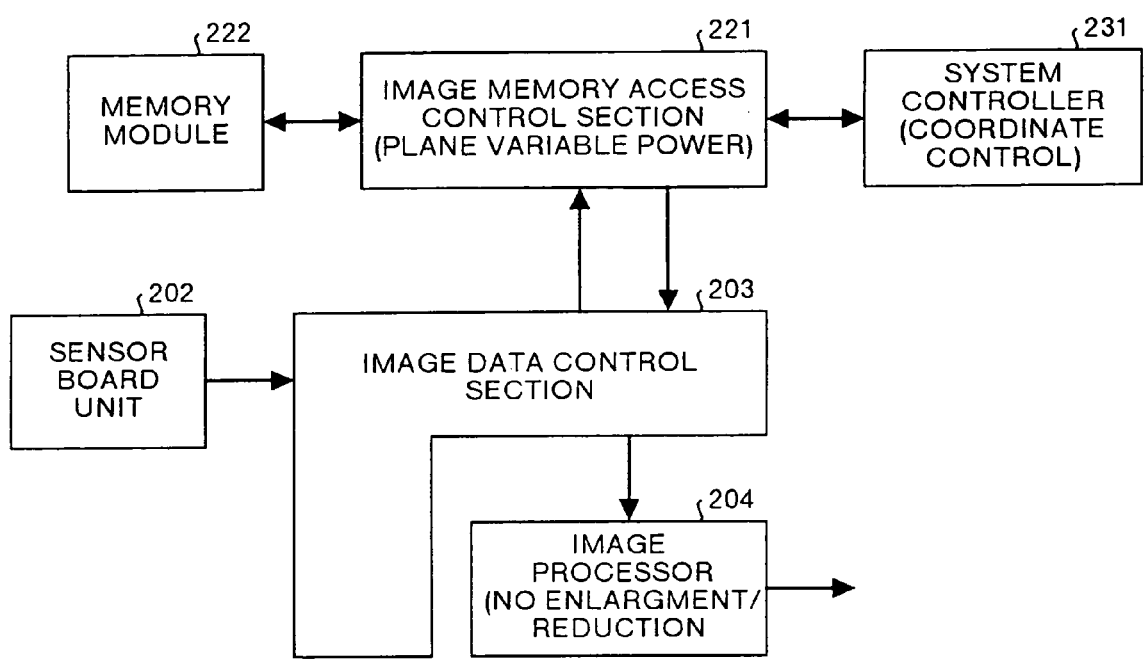
FIG. 14 is a diagram schematically illustrating a data flow in an electrical enlargement/reduction processing according to a third embodiment.

FIG. 14 is a diagram schematically showing flow of data obtained in an electrical enlargement/reduction processing according to a third embodiment. The third embodiment is different from the first embodiment in that an image memory access control section 221 does not carry out rotation control, an image processor 204 does not carry out a enlargement/reduction processing and a system controller 231 carries out a plane enlargement/reduction processing through coordinate control to be executed for resampling and memory access control to be performed through the image memory access control section 221.

In the third embodiment, accordingly, the image memory access control section 221 and the system controller 231 function as enlargement/reduction processing. Since other structures are the same as those in the first embodiment, repetitive description will be omitted and only differences will be explained below.

Figure 15:
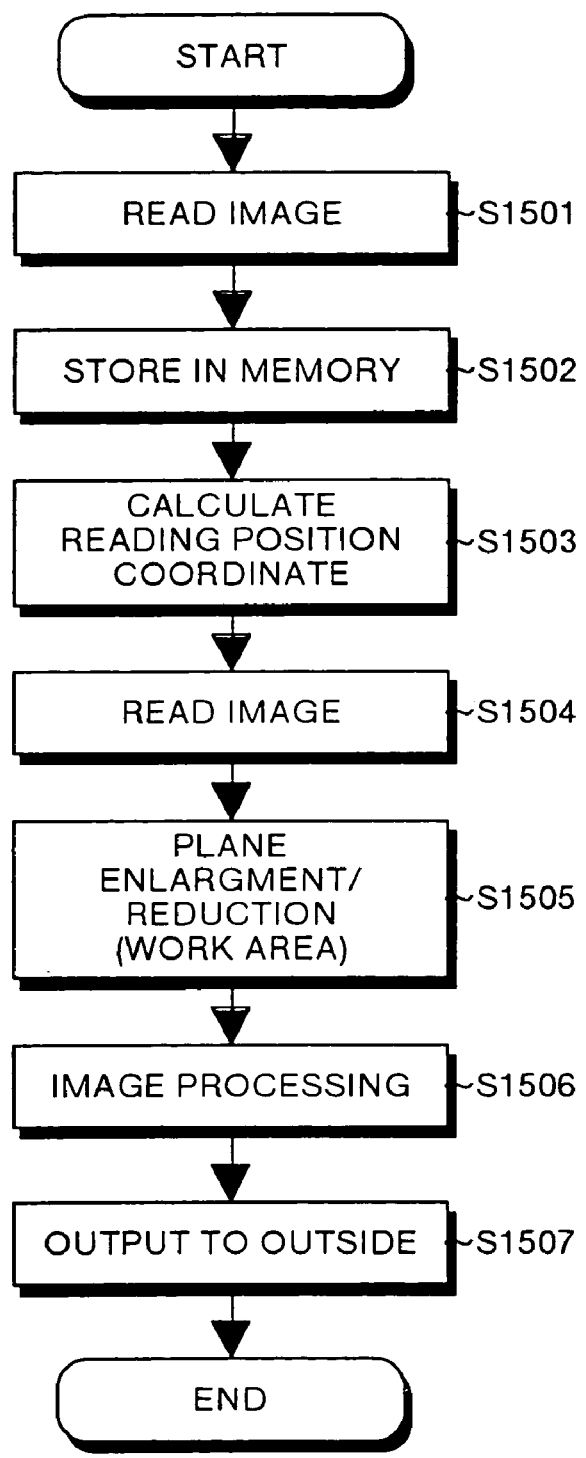
FIG. 15 is a flowchart showing the procedure for the electrical enlargement/reduction processing according to the third embodiment.

FIG. 15 is a flowchart showing a procedure for the electrical enlargement/reduction processing according to the third embodiment.

A document is read with an equimultiple (Step S1501). The read image data are stored in a memory module 222 through an image data control section 203 and the image memory access control section 221 (Step S1502).

In that case, a document size is detected and information about the document size is stored as an index in the memory module 222 together with corresponding image data. Then, a reading pixel position for resampling is calculated based on the index related to the image size and enlargement/reduction specifying conditions through the system controller 231 (Step S1503).

Subsequently, original image data are read out in a two-dimensional layout from the memory module 222 (Step S1504). An operation processing in the system controller 231 is carried out and an operational processing for the plane enlargement/reduction processing is programmably carried out through the memory access control in the image memory access control section 221 (Step S1505).

The image data which have been subjected to the enlargement/reduction processing are transferred to the image processor 204 through the image data control section 203 and the image processing is carried out through the operation processor (Step S1506). Then, the image data are output to the outside of the image processor 204 (Step S1507).

According to the third embodiment, the plane enlargement/reduction processing is carried out by the system controller 231 and the image memory access control section 221 and a division and sharing processing is carried out to execute an image processing such as MTF correction or a gradation processing by the image processor 204. Therefore, the performance of a system can be maintained in the pipeline processing of the image data.

Moreover, the system division of a concurrent operation can be controlled by the system controller 231 and the process controller 211. Accordingly, a processing load is distributed and the entire processing efficiency can be enhanced.

Figure 16:
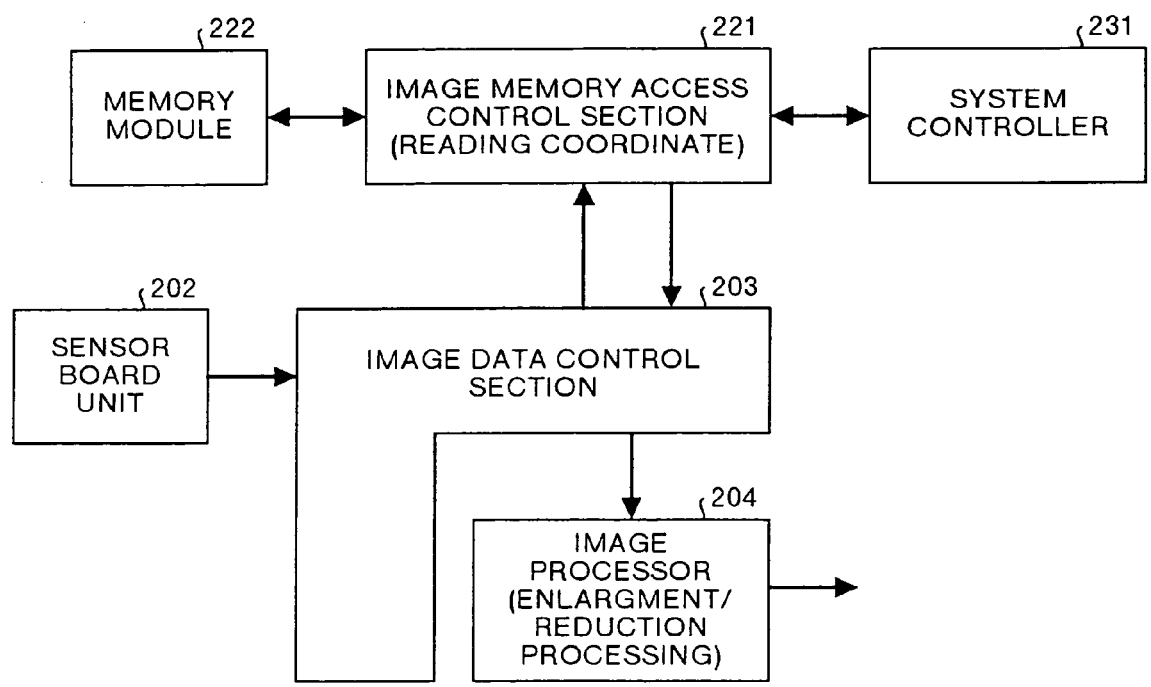
FIG. 16 is a diagram schematically illustrating a data flow in an electrical enlargement/reduction processing according to a fourth embodiment.

FIG. 16 is a diagram schematically showing a data flow obtained in an electrical enlargement/reduction processing according to a fourth embodiment. The fourth embodiment is different from the first embodiment in that an image memory access control section 221 does not carry out rotation control and a system controller 231 computes reading coordinates for calculating resampling data.

Accordingly, the system controller 231 functions as reference data reading unit. Since other structures are the same as those in the first embodiment, repetitive description will be omitted and only differences will be explained below.

Figure 17:
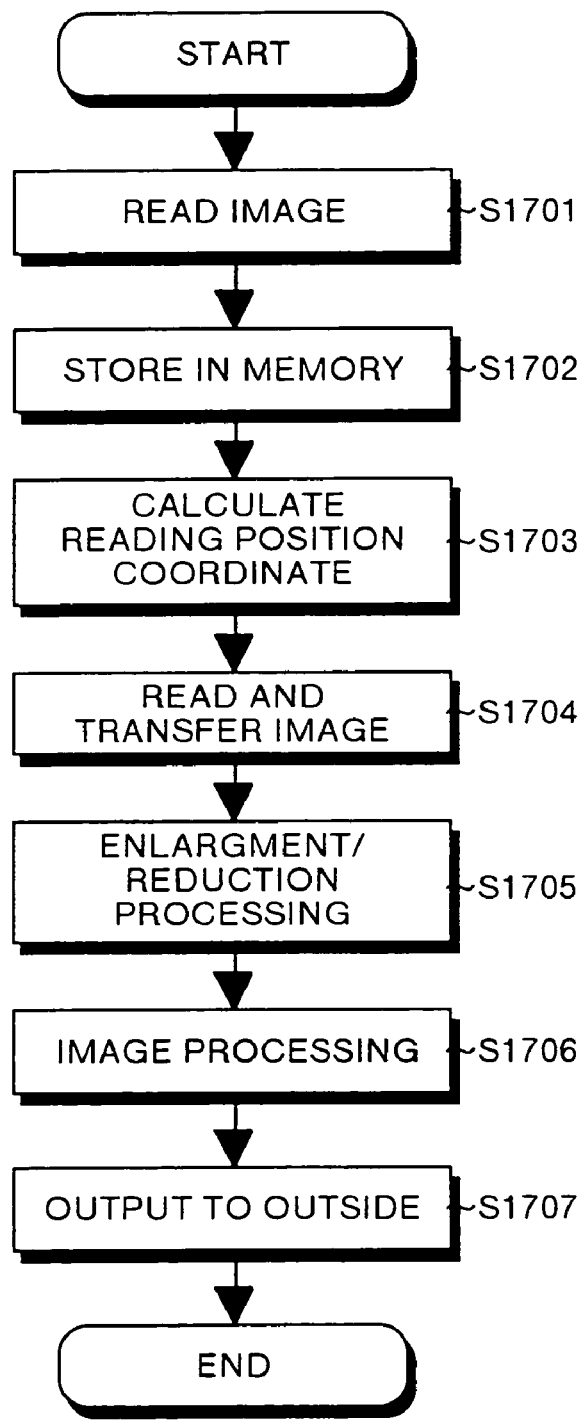
FIG. 17 is a flowchart showing the procedure for the electrical enlargement/reduction processing according to the fourth embodiment.
Figure 18:
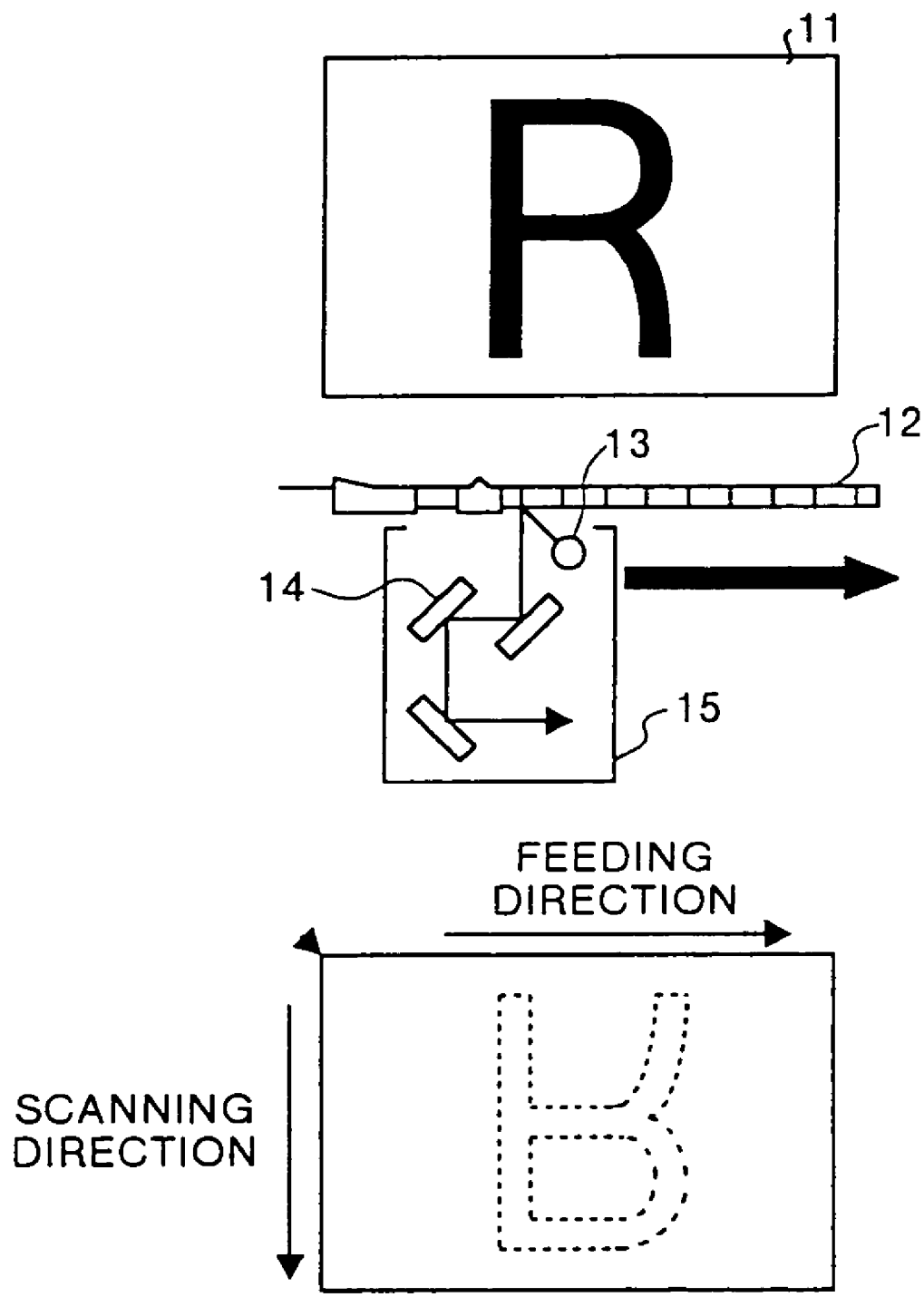
FIG. 18 is a diagram typically illustrating a reading mechanism of an ordinary document reading unit.
Figure 19:
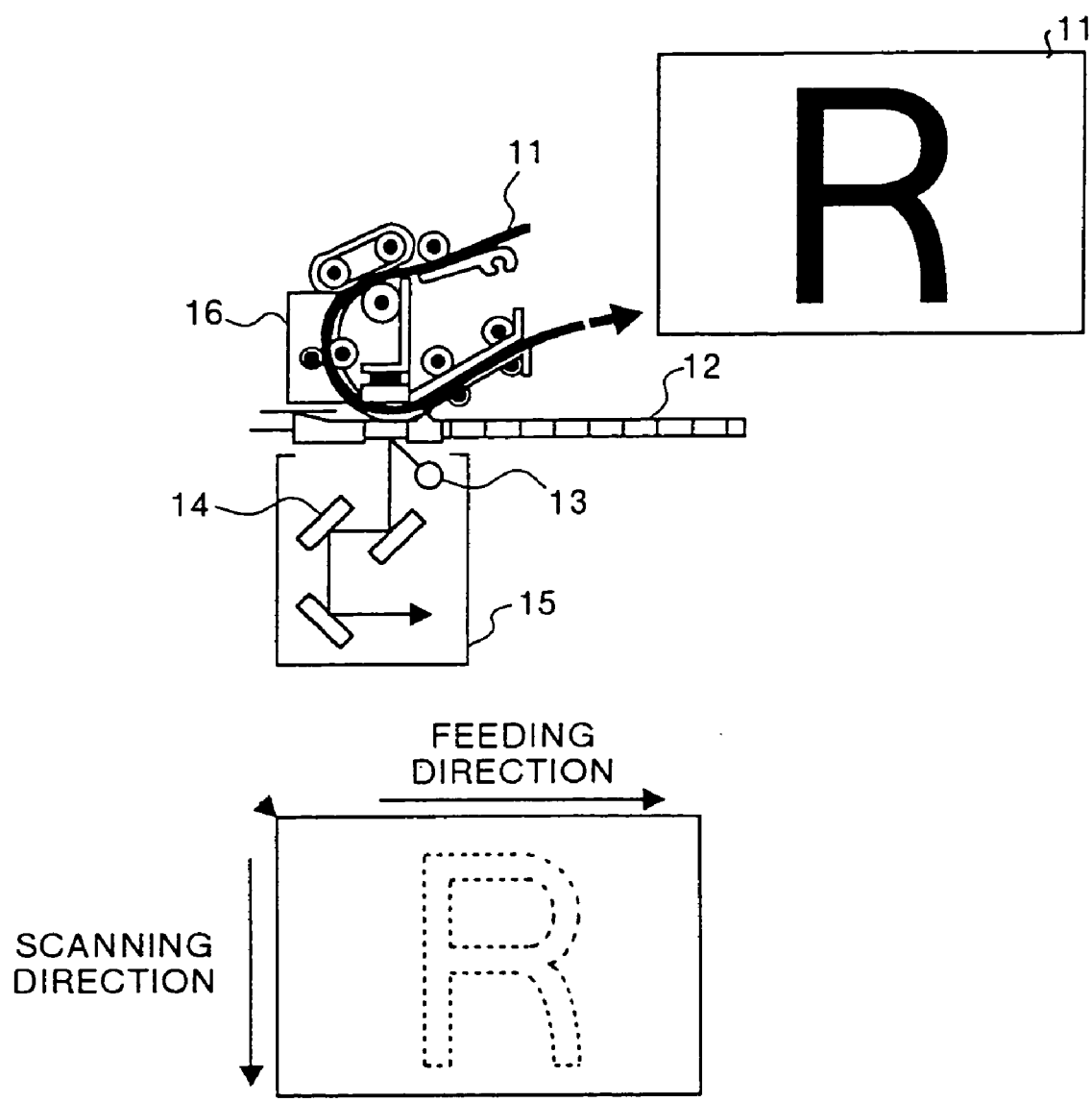
FIG. 19 is a diagram typically illustrating a reading mechanism of an ordinary sheet through document feeder.

FIG. 17 is a flowchart showing a procedure for the electrical enlargement/reduction processing according to the fourth embodiment. A document is read with an equimultiple (Step S1701). The read image data are stored in a memory module 222 through an image data control section 203 and the image memory access control section 221 (Step S1702).

In that case, a document size is detected and information about the document size is stored as an index in the memory module 222 together with corresponding image data. The information about an image size is used for calculating a enlargement/reduction factor during a paper specifying enlargement/reduction. Subsequently, the address of a reference pixel for calculating resampling data is computed based on enlargement/reduction specifying conditions through the system controller 231 (Step S1703).

Based on the address, the image data on an object address are read out through the image memory access control section 221 and are transferred to an image processor 204 through the image data control section 203 (Step S1704).

The image memory access control section 221 also functions as reference data reading unit together with the system controller 231.

A weighting factor for a necessary pixel is downloaded through a process controller 211 in the image processor 204 and a enlargement/reduction processing is carried out through an operation processor (Step S1705). In other words, a plane enlargement/reduction related to scanning and feeding is expanded in a direction of each axis and a convolutional operation is carried out. A predetermined image processing is carried out for the image data which have been subjected to the enlargement/reduction processing (Step S1706). Then, the image data are output to the outside of the image processor 204 (Step S1707).

According to the fourth embodiment, an SIMD type or sequential DSP processor special for an operation is used. Therefore, a high-speed processing can be carried out. The system controller 231 carries out the address computation of a reference pixel for resampling data calculation, the image memory access control section 221 controls a memory access and the image processor 204 carries out a enlargement/reduction processing and an image processing. Consequently, each processing can be shared by completely optimum processing means. Accordingly, a processing speed can be increased.

The image processing apparatus according to one aspect of the present invention comprises a document reading unit for reading a document at a constant speed and generating image data constituted by a digital signal, a storing unit for storing image data generated by the document reading unit together with information about a document size corresponding to the image data, a enlargement/reduction specifying unit for specifying a enlargement/reduction condition when the read document is to be output, a enlargement/reduction factor calculating device for calculating a enlargement/reduction factor based on the information about the document size stored in the storing unit and the enlargement/reduction condition specified by the enlargement/reduction specifying unit, a enlargement/reduction unit for carrying out a enlargement/reduction processing for the image data stored in the storing unit based on the enlargement/reduction factor calculated by the enlargement/reduction factor calculating device, an image processing unit for carrying out an image processing for the image data subjected to the enlargement/reduction processing by the enlargement/reduction unit, and an output unit for outputting, as a mirror image, the image data subjected to the image processing through the image processing unit. Therefore, even if the documents having various sizes are mixed, they can be read by using a sheet through document feeder. Accordingly, it is possible to obtain an image processing apparatus which does not need a mechanical enlargement/reduction mechanism for controlling a relative document feeding speed for an optical reading mechanism for the document differently from the conventional art.

Further, the enlargement/reduction unit includes relocation data calculating unit for calculating relation data in a one-dimensional direction for a feeding direction and a scanning direction respectively, and an image rotating unit for generating image data corresponding to an image obtained by rotating an original image by 90 degrees. Therefore, the enlargement/reduction processing is carried out in one direction and the image is then rotated by 90 degrees to carry out the enlargement/reduction processing in one direction again. Consequently, even if only one device for carrying out the enlargement/reduction processing in the one-dimensional direction is provided, the enlargement/reduction processing can be electrically executed in the feeding direction and the scanning direction. Accordingly, the enlargement/reduction mechanism can be aggregated into one place. Thus, a processing module can be utilized effectively.

Further, the enlargement/reduction unit includes a first relocation data calculating unit for calculating relocation data in a one-dimensional direction for a feeding direction, and a second relocation data calculating unit for calculating relocation data in the one-dimensional direction for a scanning direction. Therefore, the electrical enlargement/reduction processing in the scanning direction can be carried out at the same time through another device for executing the enlargement/reduction processing in the one-dimensional direction while one device for carrying out the enlargement/reduction processing in the one-dimensional direction executes the electrical enlargement/reduction processing in the feeding direction. Accordingly, the present invention can be applied to the concurrent operation of the system without reducing a processing performance. Consequently, the efficiency of the concurrent operation can be controlled.

Further, the enlargement/reduction unit is provided independently of the image processing unit and relocation data are calculated at the same time in both a feeding direction and a scanning direction. Therefore, an image processing mechanism is distributed into a plurality of portions. One of the mechanisms can carry out the electrical enlargement/reduction processings in the feeding direction and the scanning direction at the same time. Accordingly, it is possible to enhance the entire processing efficiency by distributing the processing load.

Further, the enlargement/reduction unit includes a reference data reading unit for reading, from the storing unit, image data of a reference pixel for calculating relocation data in a plane area, and a relocation data calculating unit for calculating relocation data in both a feeding direction and a scanning direction for the image data read from the reference data reading unit. Therefore, the operation for reading the image data of the reference pixel and the electrical enlargement/reduction processings in the feeding direction and the scanning direction can be shared. Accordingly, a processing speed can be increased.

The image processing method according to another aspect of the present invention comprises a document reading step of reading a document at a constant speed and generating image data constituted by a digital signal, a storing step of storing the image data generated at the document reading step together with information about a document size corresponding to the image data, a enlargement/reduction specifying step of specifying a enlargement/reduction condition when the read document is to be output, a enlargement/reduction factor calculating step of calculating a enlargement/reduction factor based on the information about the document size stored at the storing step and the enlargement/reduction condition specified at the enlargement/reduction specifying step, a enlargement/reduction step of carrying out a enlargement/reduction processing for the image data stored at the storing step based on the enlargement/reduction factor calculated at the enlargement/reduction factor calculating step, an image processing step of carrying out an image processing for the image data subjected to the enlargement/reduction processing at the enlargement/reduction step, and an output step of outputting, as a mirror image, the image data subjected to the image processing at the image processing step. Therefore, even if the documents having various sizes are mixed, they can be read by using a sheet through document feeder. Accordingly, it is possible to obtain an image processing apparatus which does not need a mechanical enlargement/reduction mechanism for controlling a relative document feeding speed for an optical reading mechanism for the document differently from the conventional art.

Further, the enlargement/reduction step includes a first data transferring step of transferring original image data to a device for calculating relocation data in a one-dimensional direction, a first relocation data calculating step of calculating relocation data for the original image data transferred at the first data transferring step, a second data transferring step of transferring the relocation data calculated at the first relocation data calculating step to a device for generating image data corresponding to an image rotated by 90 degrees, an image rotating step of generating image data corresponding to the image rotated by 90 degrees with respect to an image of the relocation data transferred at the second data transferring step, a third data transferring step of transferring the image data obtained at the image rotating step to the device for calculating relocation data in a one-dimensional direction, and a second relocation data calculating step of calculating relocation data for the image data transferred at the third data transferring step. Therefore, even if only one device for carrying out the enlargement/reduction processing in the one-dimensional direction is provided, the enlargement/reduction processing can be electrically executed in the feeding direction and the scanning direction. Accordingly, the enlargement/reduction mechanism can be aggregated into one place. Thus, a processing module can be utilized effectively.

Further, the enlargement/reduction step includes a first data transferring step of transferring original image data to first means for calculating relocation data in one of a scanning direction and a feeding direction, a first relocation data calculating step of calculating relocation data for the original image data transferred at the first data transferring step, a second data transferring step of transferring the relocation data calculated at the first relocation data calculating step to a second device for calculating relocation data in the other one of the scanning direction and the feeding direction, and a second relocation data calculating step of calculating relocation data for the relocation data transferred at the second data transferring step. Therefore, the electrical enlargement/reduction processing in the scanning direction can be carried out at the same time through another device for executing the enlargement/reduction processing in the one-dimensional direction while one device for carrying out the enlargement/reduction processing in the one-dimensional direction executes the electrical enlargement/reduction processing in the feeding direction. Accordingly, the present invention can be applied to the concurrent operation of the system without reducing a processing performance. Consequently, the efficiency of the concurrent operation can be controlled.

Further, the enlargement/reduction step is carried out by a device independent of a device for executing the image processing step and relocation data are calculated at the same time in both a feeding direction and a scanning direction. Therefore, an image processing mechanism is distributed into a plurality of portions. One of the mechanisms can carry out the electrical enlargement/reduction processings in the feeding direction and the scanning direction at the same time. Accordingly, it is possible to enhance the entire processing efficiency by distributing the processing load.

Further, the enlargement/reduction step includes a reference data reading step of reading, at the storing step, image data of a reference pixel for calculating relocation data in a plane area, a data transferring step of transferring the image data read at the reference data reading step to a device for calculating relocation data in both a feeding direction and a scanning direction, and a relocation data calculating step of calculating relocation data for the image data transferred at the data transferring step. Therefore, the operation for reading the image data of the reference pixel and the electrical enlargement/reduction processings in the feeding direction and the scanning direction can be shared. Accordingly, a processing speed can be increased.

A program for causing a computer to execute the method according to the present invention is stored in the recording medium according to the present invention. Consequently, it is possible to execute the method according to the present invention on a computer readily and automatically.

The present document incorporated by reference the entire contents of Japanese priority document, 11-334694 filed in Japan on Nov. 25, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus, comprising:
a document reading unit configured to read a document at a constant speed and to generate image data comprising a digital signal;
a size detection unit configured to detect a size of said document read by said document reading unit, wherein the size detection unit is configured to detect the size of said document after said document is read by said document reading unit;
a storing unit configured to store the image data generated by said document reading unit in association with information about the detected size of said read document;
an enlargement/reduction specifying unit configured to specify an enlargement/reduction condition when said read document is to be output;
an enlargement/reduction factor calculating unit configured to calculate an enlargement/reduction factor based on the information about the size of said read document stored in said storing unit and the enlargement/reduction condition specified by said enlargement/reduction specifying unit; and
an enlargement/reduction unit configured to carry out enlargement/reduction of the image data stored in said storing unit based on the enlargement/reduction factor calculated by said enlargement/reduction factor calculating unit,
wherein said document reading unit reads the document prior to specification of said enlargement/reduction condition.

2. The image processing apparatus according to claim 1, wherein said enlargement/reduction unit comprises:
a relocation data calculating unit configured to calculate relation data in a one-dimensional direction for a feeding direction and a scanning direction, respectively; and
an image rotating unit configured to generate image data corresponding to an image obtained by rotating an original image by 90 degrees.

3. The image processing apparatus according to claim 1, wherein said enlargement/reduction unit comprises:
- a first relocation data calculating unit configured to calculate relocation data in a one-dimensional direction for a feeding direction; and
- a second relocation data calculating unit configured to calculate relocation data in the one-dimensional direction for a scanning direction.

4. The image processing apparatus according to claim 1, wherein said enlargement/reduction unit is provided independently of said image processing unit, and relocation data are calculated at a same time in both a feeding direction and a scanning direction.

5. The image processing apparatus according to claim 1, wherein said enlargement/reduction unit comprises:
- a reference data reading unit configured to read, from said storing unit, image data of a reference pixel for calculating relocation data in a plane area; and
- a relocation data calculating unit configured to calculate relocation data in both a feeding direction and a scanning direction for the image data read from said reference data reading unit.

6. The image processing apparatus of claim 1, wherein the document reading unit comprises a sheet-through document feeder.

7. An image processing method, comprising:
- a document reading step of reading a document at a constant speed and generating image data comprising a digital signal;
- detecting a size of said read document, wherein the detecting step is performed after the document reading step;
- a storing step of storing the image data generated at the document reading step in association with information about the size of said read document detected in the detecting step;
- an enlargement/reduction specifying step of specifying an enlargement/reduction condition when said read document is to be output, said enlargement/reduction specifying step being performed after said document reading step;
- an enlargement/reduction factor calculating step of calculating a enlargement/reduction factor based on the information about the document size stored at the storing step and the enlargement/reduction condition specified at the enlargement/reduction specifying step;
- an enlargement/reduction step of carrying out a enlargement/reduction processing for the image data stored at the storing step based on the enlargement/reduction factor calculated at the enlargement/reduction factor calculating step;
- an image processing step of carrying out an image processing for the image data subjected to the enlargement/reduction processing at the enlargement/reduction step; and
- an output step of outputting, as a mirror image, the image data subjected to the image processing at the image processing step.

8. The image processing method according to claim 7, wherein the enlargement/reduction step comprises:
- a first data transferring step of transferring original image data to a unit which calculates relocation data in a one-dimensional direction;
- a first relocation data calculating step of calculating relocation data for the original image data transferred at the first data transferring step;
- a second data transferring step of transferring the relocation data calculated at the first relocation data calculating step a unit which generates image data corresponding to an image rotated by 90 degrees;
- an image rotating step of generating image data corresponding to the image rotated by 90 degrees with respect to an image of the relocation data transferred at the second data transferring step;
- a third data transferring step of transferring the image data obtained at the image rotating step said unit which calculates relocation data in a one-dimensional direction; and
- a second relocation data calculating step of calculating relocation data for the image data transferred at the third data transferring step.

9. The image processing method according to claim 7, wherein the enlargement/reduction step comprises:
- a first data transferring step of transferring original image data to a first unit which calculates relocation data in one of a scanning direction and a feeding direction;
- a first relocation data calculating step of calculating relocation data for the original image data transferred at the first data transferring step;
- a second data transferring step of transferring the relocation data calculated at the first relocation data calculating step to a second unit which calculates relocation data in the other one of the scanning direction and the feeding direction; and
- a second relocation data calculating step of calculating relocation data for the relocation data transferred at the second data transferring step.

10. The image processing method according to claim 7, wherein the enlargement/reduction step is carried out by a unit which is different from the unit which executes the image processing step and relocation data are calculated at the same time in both a feeding direction and a scanning direction.

11. The image processing method according to claim 7, wherein the enlargement/reduction step comprises:
- a reference data reading step of reading, at the storing step, image data of a reference pixel for calculating relocation data in a plane area;
- a data transferring step of transferring the image data read at the reference data reading step to a unit which calculates relocation data in both a feeding direction and a scanning direction; and
- a relocation data calculating step of calculating relocation data for the image data transferred at the data transferring step.

12. A computer readable medium for storing instructions, which when executed by a computer, causes the computer to perform:
- a document reading step of reading a document at a constant speed and generating image data comprising a digital signal;
- detecting a size of said read document, wherein the detecting step is performed after the document reading step;
- a storing step of storing the image data generated at the document reading step in association with information about the size of said read document detected in the detecting step;
- an enlargement/reduction specifying step of specifying an enlargement/reduction condition when said read document is to be output, said enlargement/reduction specifying step being performed after said document reading step;

an enlargement/reduction factor calculating step of calculating an enlargement/reduction factor based on the information about the document size stored at the storing step and the enlargement/reduction condition specified at the enlargement/reduction specifying step; and an enlargement/reduction step of carrying out an enlargement/reduction processing for the image data stored at the storing step based on the enlargement/reduction factor calculated at the enlargement/reduction factor calculating step.

13. An image processing apparatus, comprising:

a document reading unit configured to read a document at a constant speed and to generate image data comprising a digital signal;

a size detection unit configured to detect a size of said document read by said document reading unit, wherein the size detection unit is configured to detect the size of said document after said document is read by said document reading unit;

a storing unit configured to store the image data generated by said document reading unit;

an enlargement/reduction specifying unit configured to specify an enlargement/reduction condition when said read document is to be output;

an enlargement/reduction factor calculating unit configured to calculate an enlargement/reduction factor based on the information about the size of said read document stored in said storing unit and the enlargement/reduction condition specified by said enlargement/reduction specifying unit; and an enlargement/reduction unit configured to carry out enlargement/reduction of the image data stored in said storing unit based on the enlargement/reduction factor calculated by said enlargement/reduction factor calculating unit, wherein the detection detects the size after the image data generated by said document reading unit is stored in said storing unit.

14. An image processing method, comprising:

a document reading step of reading a document at a constant speed and generating image data comprising a digital signal;

detecting a size of said read document, wherein the detecting step is performed after the document reading step;

a storing step of storing the image data generated at the document reading step;

an enlargement/reduction specifying step of specifying an enlargement/reduction condition when said read document is to be output;

an enlargement/reduction factor calculating step of calculating a enlargement/reduction factor based on the information about the document size stored at the storing step and the enlargement/reduction condition specified at the enlargement/reduction specifying step;

an enlargement/reduction step of carrying out a enlargement/reduction processing for the image data stored at the storing step based on the enlargement/reduction factor calculated at the enlargement/reduction factor calculating step;

an image processing step of carrying out an image processing for the image data subjected to the enlargement/reduction processing at the enlargement/reduction step; and an output step of outputting, as a mirror image, the image data subjected to the image processing at the image processing step, wherein the detecting of the size is performed after the image storing step.

* * * * *